United States Patent
Ngu

(10) Patent No.: US 10,324,651 B2
(45) Date of Patent: Jun. 18, 2019

(54) DATA TRANSMISSION METHOD, AND STORAGE CONTROLLER AND LIST MANAGEMENT CIRCUIT USING THE SAME

(71) Applicant: SHENZHEN EPOSTAR ELECTRONICS LIMITED CO., Shenzhen (CN)

(72) Inventor: Di-Hsien Ngu, Hsinchu County (TW)

(73) Assignee: SHENZHEN EPOSTAR ELECTRONICS LIMITED CO., Shenzhen (CN)

( * ) Notice: Subject to any disclaimer, the term of this patent is extended or adjusted under 35 U.S.C. 154(b) by 168 days.

(21) Appl. No.: 15/293,285

(22) Filed: Oct. 14, 2016

(65) Prior Publication Data

US 2018/0052634 A1 Feb. 22, 2018

(30) Foreign Application Priority Data

Aug. 19, 2016 (TW) .............................. 105126508 A

(51) Int. Cl.
G06F 3/06 (2006.01)
(52) U.S. Cl.
CPC ............ *G06F 3/0647* (2013.01); *G06F 3/064* (2013.01); *G06F 3/0611* (2013.01); *G06F 3/0656* (2013.01); *G06F 3/0659* (2013.01); *G06F 3/0679* (2013.01); *G06F 3/0683* (2013.01); *G06F 3/0688* (2013.01)
(58) Field of Classification Search
CPC ...... G06F 3/0647; G06F 3/0611; G06F 3/064; G06F 3/0656; G06F 3/0683; G06F 3/0659; G06F 3/0679; G06F 3/0688
See application file for complete search history.

(56) References Cited

U.S. PATENT DOCUMENTS

2015/0319237 A1* 11/2015 Hussain .................. G06F 3/065
 709/217
2017/0308329 A1* 10/2017 A .......................... G06F 3/0659

OTHER PUBLICATIONS

NVM Express, "NVM Express revision 1.2 specification ," Nov. 3, 2014, Available at: http://nvmexpress.org/wp-content/uploads/NVM_Express_1_2_Gold_20141209.pdf.
"Office Action of Taiwan Counterpart Application", dated Feb. 17, 2017, p. 1-p. 7.

* cited by examiner

*Primary Examiner* — Larry T Mackall
(74) *Attorney, Agent, or Firm* — JCIPRNET

(57) ABSTRACT

A data transmission method is provided. The method includes receiving a transmission command from a host system, wherein the transmission command includes a starting logical block address, a number of logical blocks, a first physical region page pointer, and a second physical region page pointer, wherein the transmission command is configured to transmit target data between at least one target logical block of a rewritable non-volatile memory module and at least one target memory page of a host memory; buffering a plurality of entries of at least one physical region page pointer list corresponding to the transmission command if the second physical region page pointer is a first list starting address of a first physical region page pointer list corresponding to the transmission command; and transmitting corresponding data according to the buffered entries.

15 Claims, 13 Drawing Sheets

DATA TRANSMISSION METHOD, AND STORAGE CONTROLLER AND LIST MANAGEMENT CIRCUIT USING THE SAME

CROSS-REFERENCE TO RELATED APPLICATION

This application claims the priority benefit of Taiwan application serial no. 105126508, filed on Aug. 19, 2016. The entirety of the above-mentioned patent application is hereby incorporated by reference herein and made a part of this specification.

BACKGROUND

Technical Field

The invention relates to a data transfer method, and more particularly, to a data transmission method, and a storage controller and a list management circuit using the method.

Description of Related Art

The growth of digital cameras, mobile phones, and MP3 players has been rapid in recent years. Consequently, the consumers' demand for storage media has increased tremendously. A rewritable non-volatile memory is one of the most adaptable memories for said electronic products due to its data non-volatility, low power consumption, small volume, non-mechanical structure and high read/write speed. For these reasons, flash memory has become an import part of the electronic industries. For example, an eMMC (embedded Multi Media Card) widely adopted in mobile electronic device is one storage device that uses the flash memory as a storage medium.

To cooperate with higher write/read speed of a rewritable non-volatile memory storage device (e.g., a solid state drive), many data transfer interfaces (e.g., Peripheral Component Interconnect Express; PCIe interface) have started to support more advanced data transfer protocol, such as a Non-Volatile Memory express (NVMe) interface standard, so as to comply with a working efficiency of the high speed rewritable non-volatile memory storage device.

The NVMe interface standard defines a plurality of access commands for user data transfer. The access commands have various command parameters. In general, a storage controller of the existing rewritable non-volatile memory storage device can sequentially access data between a host memory of a host system and the rewritable non-volatile memory according to said command parameters of the received access commands. When accessing data, a list corresponding to the access commands is read from the host memory, so that the memory address corresponding to the data to be accessed in the host memory is obtained. However, searching the corresponding memory address from the list corresponding to the access command stored in the host memory may result an occurrence of system delay, and thus reduce the efficiency of data access.

Thereby, how to reduce the said system delay so as to improve the efficiency of data access is one of the major subjects in the industry.

Nothing herein should be construed as an admission of knowledge in the prior art of any portion of the present invention. Furthermore, citation or identification of any document in this application is not an admission that such document is available as prior art to the present invention, or that any reference forms a part of the common general knowledge in the art.

SUMMARY

The invention is directed to a data transmission method, and a storage controller and a list management circuit using the method, which are capable of reducing the system delay resulting from reading list, and improving the efficiency of data access.

An embodiment of the invention provides a data transmission method, which is suitable for a data transmission operation between a host memory of a host system and a rewritable non-volatile memory module. The rewritable non-volatile memory module is assigned with a plurality of logical blocks and the host memory has a plurality of memory pages. The method includes receiving a transmission command from a host system. The transmission command includes a starting logical block address (SLBA), a number of logical blocks (NLB), a first physical region page pointer (PRP1), and a second physical region page pointer (PRP2). The transmission command is configured to transmit target data between at least one target logical block of a rewritable non-volatile memory module and at least one target memory page of a host memory. The starting logical block address is configured to indicate an address of the foremost target logical block in the at least one target logical block. The number of logical blocks is configured to indicate a number of the logical blocks storing the target data in the at least one target logical block. The first physical region page pointer is configured to indicate a first memory page address of the host memory, and the second physical region page pointer is configured to indicate a second memory page address of the host memory. If the second memory page address is a first list starting address of a first physical region page pointer list of at least one physical region page pointer list (PRP list) corresponding to the transmission command, reading a part of the at least one physical region page pointer list from the host memory according to the transmission command, buffering the read part of the at least one physical region page pointer list, and transmitting corresponding data according to the buffered part of the at least one physical region page pointer list. The transmitted data is a part of the target data.

An embodiment of the invention provides a storage controller, which is configured to control a storage device having a rewritable non-volatile memory module. The storage controller includes a connection interface circuit, a memory interface control circuit, a processor, a data transfer management circuit and a list management circuit. The connection interface circuit is configured to couple to a host system. The host system has a host memory, and the host memory has a plurality of memory pages. The memory interface control circuit is configured to couple to the rewritable non-volatile memory module, and the rewritable non-volatile memory module is assigned with a plurality of logical blocks. The processor is coupled to the connection interface circuit and the memory interface control circuit. The data transfer management circuit is coupled to the processor, the connection interface circuit and the memory interface control circuit. The list management circuit is coupled the data transfer management circuit, the processor, the connection interface circuit and the memory interface control circuit. The processor is configured to receive a transmission command from a host system. The transmission command includes a starting logical block address, a number of logical blocks, a first physical region page pointer, and a second physical region page pointer. The transmission command is configured to transmit target data between at least one target logical block of a rewritable non-volatile memory module and at least one target memory page of a host memory. The starting logical block address is configured to indicate an address of the foremost target logical block in the at least one target logical block. The number of logical blocks is configured to indicate a number of the logical blocks storing the target data in the at least one target logical block. The first physical region page pointer is configured to indicate a first memory page address of the host memory, and the second physical region page pointer is configured to indicate a second memory page address of the host memory. If the second memory page address is a first list starting address of a first physical region page pointer list of at least one physical region page pointer list corresponding to the transmission command, the list management circuit is configured to read a part of the at least one physical region page pointer list from the host memory according to the transmission command, and buffer the read part of the at least one physical region page pointer list. The data transfer management circuit is configured to transmit corresponding data according to the buffered part of the at least one physical region page pointer list. The transmitted data is a part of the target data.

An embodiment of the invention provides a list management circuit, which is disposed in a storage controller of a storage device. The storage controller further includes a connection interface circuit, a memory interface control circuit and a processor. The connection interface circuit is configured to couple to a host system. The host system has a host memory, and the host memory has a plurality of memory pages. The memory interface control circuit is configured to couple to the rewritable non-volatile memory module, and the rewritable non-volatile memory module is assigned with a plurality of logical blocks. The processor is coupled to the connection interface circuit and the memory interface control circuit. The data transfer management circuit is coupled to the processor, the connection interface circuit and the memory interface control circuit. The list management circuit is coupled the data transfer management circuit, the processor, the connection interface circuit and the memory interface control circuit. The list management circuit includes a list controller, a list buffer memory and a list obtaining circuit. The list buffer memory is coupled to the list controller. The list obtaining circuit is coupled to the list controller and the list buffer memory. The processor is configured to receive a transmission command from a host system. wherein the transmission command includes a starting logical block address, a number of logical blocks, a first physical region page pointer, and a second physical region page pointer. The transmission command is configured to transmit target data between at least one target logical block of a rewritable non-volatile memory module and at least one target memory page of a host memory. The starting logical block address is configured to indicate an address of the foremost target logical block in the at least one target logical block. The number of logical blocks is configured to indicate a number of the logical blocks storing the target data in the at least one target logical block. The first physical region page pointer is configured to indicate a first memory page address of the host memory, and the second physical region page pointer is configured to indicate a second memory page address of the host memory. If the second memory page address is a first list starting address of a first physical region page pointer list of at least one physical region page pointer list corresponding to the transmission command, the list controller is configured to instruct the list obtaining circuit to read a part of the at least one physical region page pointer list from the host memory according to the transmission command, and the list controller is further configured to buffer the read part of the at least one physical region page pointer list into the list buffer memory. The data transfer management circuit is configured to transmit corresponding data according to the buffered part of the at least one physical region page pointer list. The transmitted data is a part of the target data.

Based on the above, in the data transmission method, and the storage controller and the list management circuit using the method provided by the embodiments of the present invention, a hardware is used to buffer the physical region page pointer list corresponding to the transmission command, so that the data transmission operation can be performed according to the buffered physical region page pointer list. In this way, the delay between the storage apparatus and the host system is reduced, the speed of data transfer is increased, and the working efficiencies of the storage apparatus the data transmission operation performed by the storage apparatus are improved.

To make the above features and advantages of the present invention more comprehensible, several embodiments accompanied with drawings are described in detail as follows.

It should be understood, however, that this Summary may not contain all of the aspects and embodiments of the present invention, is not meant to be limiting or restrictive in any manner, and that the invention as disclosed herein is and will be understood by those of ordinary skill in the art to encompass obvious improvements and modifications thereto.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
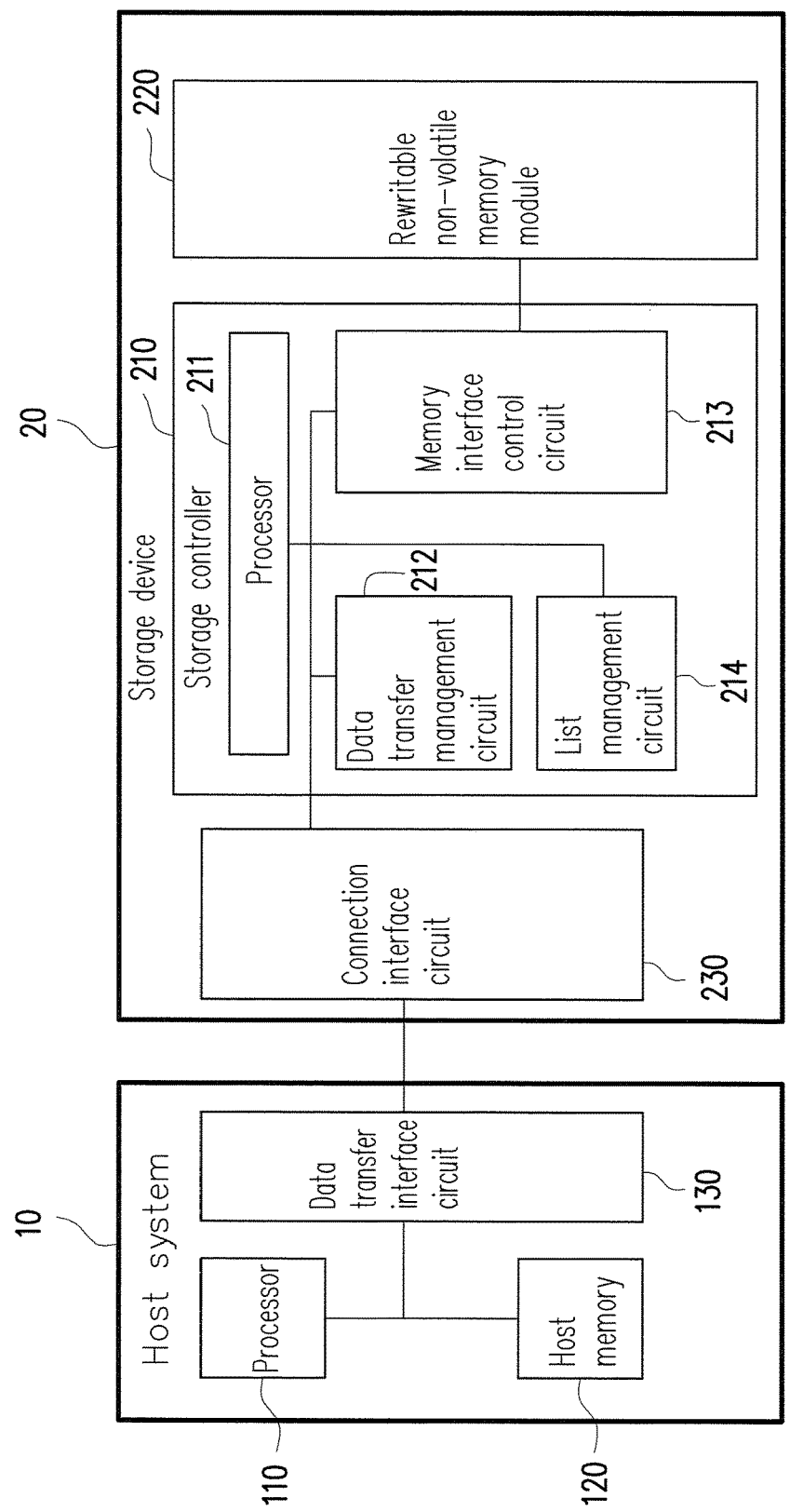
FIG. 1 is a block diagram illustrating a host system and a storage device according to an embodiment of the invention.

Reference will now be made in detail to the present preferred embodiments of the invention, examples of which are illustrated in the accompanying drawings. Wherever possible, the same reference numbers are used in the drawings and the description to refer to the same or like parts.

Embodiments of the present invention may comprise any one or more of the novel features described herein, including in the Detailed Description, and/or shown in the drawings. As used herein, "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

It is to be noted that the term "a" or "an" entity refers to one or more of that entity. As such, the terms "a" (or "an"), "one or more" and "at least one" can be used interchangeably herein.

Generally, a storage device includes a rewritable non-volatile memory module and a storage device controller (also known as a storage controller or a storage control circuit). The storage device is usually used together with a host system so the host system may perform data transmission operations on the storage device. For example, data may be written into or read from the storage device.

FIG. 1 is a block diagram illustrating a host system and a storage device according to an embodiment of the invention.

Referring to FIG. 1, a host system 10 includes a processor 110, a host memory 120 and a data transfer interface circuit 130. In the present embodiment, the data transfer interface circuit 130 is coupled to (or, electrically connected to) the processor 110 and the host memory 120. In another embodiment, the processor 110, the host memory 120 and the data transfer interface circuit 130 are coupled to one another by utilizing a system bus.

A storage device 20 includes a storage controller 210, a rewritable non-volatile memory module 220 and a connection interface circuit 230. Among them, the storage controller 210 includes a processor 211, a data transfer management circuit 212 and a memory interface control circuit 213.

In the present embodiment, the host system 10 is coupled to the storage device 20 through the data transfer interface circuit 130 and the connection interface circuit 230 of the storage device 20 to perform a data access operation. For example, the host system 10 can store data to the storage device 20 or read data from the storage device 20 through the data transfer interface circuit 130.

In the present embodiment, the processor 110, the host memory 120 and the data transfer interface circuit 130 may be disposed on a main board of the host system 10. The number of the data transfer interface circuit 130 may be one or more. Through the data transfer interface circuit 130, the main board may be coupled to the storage device 20 in a wired manner or a wireless manner. The storage device 20 may be, for example, a flash drive, a memory card, a solid state drive (SSD) or a wireless memory storage device. The wireless memory storage device may be, for example, a memory storage device based on various wireless communication technologies, such as a NFC (Near Field Communication) memory storage device, a WiFi (Wireless Fidelity) memory storage device, a Bluetooth memory storage device, a BLE (Bluetooth low energy) memory storage device (e.g., iBeacon). Further, the main board may also be coupled to various I/O devices including a GPS (Global Positioning System) module, a network interface card, a wireless transmission device, a keyboard, a monitor and a speaker through the system bus.

In the present embodiment, the data transfer interface circuit 130 and the connection interface circuit 230 are an interface circuit compatible with a Peripheral Component Interconnect Express (PCI Express) interface standard. Further, a data transfer is performed between the data transfer interface circuit 130 and the connection interface circuit 230 by using a communication protocol of a Non-Volatile Memory express (NVMe) interface standard.

Nevertheless, it should be understood that the invention is not limited thereto. The data transfer interface circuit 130 and the connection interface circuit 230 may also be compatible to a PATA (Parallel Advanced Technology Attachment) standard, an IEEE (Institute of Electrical and Electronic Engineers) 1394 standard, a USB (Universal Serial Bus) standard, a SD interface standard, a UHS-I (Ultra High Speed-I) interface standard, a UHS-II (Ultra High Speed-II) interface standard, a MS (Memory Stick) interface standard, a Multi-Chip Package interface standard, a MMC (Multi Media Card) interface standard, an eMMC interface standard, a UFS (Universal Flash Storage) interface standard, an eMCP interface standard, a CF interface standard, an IDE (Integrated Device Electronics) interface standard or other suitable standards. Further, in another embodiment, the connection interface circuit 230 and the storage controller 210 may be packaged into one chip, or the connection interface circuit 230 is distributed outside a chip containing the storage controller 210.

In the present embodiment, the host memory 120 is configured to temporarily store commands executed by the processor 110 or data. For instance, in the present exemplary embodiment, the host memory 120 may be a Dynamic Random Access Memory (DRAM), or a Static Random Access Memory (SRAM) and the like. Nevertheless, it should be understood that the invention is not limited thereto, and the host memory 120 may also be other appropriate memories. More specifically, in the present embodiment, the host memory 120 may be divided into a plurality of memory pages to be used in a storage management of the commands and the data. Each of the memory pages has a starting address (Starting Address of Memory Page; SAMP) and an ending address (Ending Address of Memory Page; EAMP). In the present embodiment, each of the memory pages is addressed by utilizing a 16-bit address. For example, the starting address (SAMP) of a foremost memory page being sorted may be set as "0000", and the ending address (EAMP) thereof may set as "0FFF". A size of each of the memory pages is 4096 bytes (i.e., 4 KB). A total space of the memory pages used for the data transfer by the host memory is 64 KB (i.e., 16 memory pages in total). However, the invention is not intended to limit an addressing scheme for the host memory. For example, in another embodiment, the host memory may include more or less space, and may correspondingly perform the addressing scheme with use of a proper addressing method.

The storage controller 210 is configured to execute a plurality of logic gates or control commands, which are implemented in a hardware form or in a firmware form, and to perform operations of writing, reading or erasing data in the rewritable non-volatile memory storage module 220 according to the commands of the host system 10.

More specifically, the processor 211 in the storage controller 210 is a hardware with computing capabilities, which is configured to control overall operation of the storage controller 210. Specifically, the processor 211 has a plurality of control commands. These control commands are executed to perform various operations such as writing, reading and erasing data during operation of the storage device 20.

It is noted that, in the present embodiment, the processor 110 and the processor 211 are, for example, a central processing unit (CPU), a micro-processor, other programmable microprocessors, a digital signal processor (DSP), a programmable controller, an application specific integrated circuits (ASIC), a programmable logic device (PLD) or other similar circuit elements, which are not particularly limited by the invention.

In an embodiment, the storage controller 210 further includes a ROM (not illustrated) and a RAM (not illustrated). More particularly, the ROM has a boot code, which is executed by the processor 221 to load the control commands stored in the rewritable non-volatile memory module 220 into the RAM of the storage controller 210 when the storage controller 210 is enabled. Then, the control commands are executed by the processor 211 to perform operations, such as writing, reading or erasing data. In another embodiment, the control commands of the processor 211 may also be stored as program codes in a specific area (for example, physical storage units in the rewritable non-volatile memory module 220 dedicated for storing system data) of the rewritable non-volatile memory module 220.

In the present embodiment, as described above, the storage controller 210 further includes the data transfer management circuit 212, the memory interface control circuit 213 and the list management circuit 214.

Among them, the data transfer management circuit 212 is coupled to the processor 211, the memory interface control circuit 213 and the connection interface circuit 230. The data transfer management circuit 212 is configured to receive instruction of the processor 211 to perform the data transfer. For example, the data may be read from host system 10 (e.g., the host memory 120) through the connection interface circuit 230, and the read data may be written into the rewritable non-volatile memory module 220 through the memory interface control circuit 213. As another example, the data may be read from the rewritable non-volatile memory module 220 through the memory interface control circuit 213, and the read data may be written into the host system 10 (e.g., the host memory 120) through the connection interface circuit 230.

The memory interface control circuit 213 is configured to receive instruction of the processor 211 and perform data writing (or, programming) and reading operations for the rewritable non-volatile memory module 220 together with the data transfer management circuit 212. The memory interface control circuit 213 may also perform an erasing operation for the rewritable non-volatile memory module 220.

For instance, the processor 211 may execute a write command sequence to instruct the memory interface control circuit 213 to write the data into the rewritable non-volatile memory module 220; the processor 211 may execute a read command sequence to instruct the memory interface control circuit 213 to read the data from the rewritable non-volatile memory module 220; the processor 211 may execute an erase command sequence to instruct the memory interface control circuit 213 to perform the erasing operation for the rewritable non-volatile memory module 220. Each of the write command sequence, the read command sequence and the erase command sequence may include one or more program codes or command codes, which are configured to perform the corresponding operations of writing, reading and erasing for the rewritable non-volatile memory module 220. In an embodiment, the processor 211 may further give other command sequences to the memory interface control circuit 213 in order to perform the corresponding operations for the rewritable non-volatile memory module 220.

In addition, data to be written to the rewritable non-volatile memory module 220 is converted into a format acceptable by the rewritable non-volatile memory module 220 through the memory interface control circuit 213. Specifically, when the processor 211 intends to access the rewritable non-volatile memory module 220, the processor 211 sends the corresponding command sequences to the memory interface control circuit 213 in order to instruct the memory interface control circuit 213 to perform the corresponding operations. For example, the command sequences may include the write command sequence which instructs to write data, the read command sequence which instructs to read data, the erase command sequence which instructs to erase data, and other corresponding command sequences for instructing to perform various memory operations (e.g., changing read voltage levels or performing a garbage collection procedure). The command sequences may include one or more signals, or data from the bus. The signals or the data may include command codes and program codes. For example, information such as identification codes and memory addresses are included in the read command sequence.

In the present embodiment, the memory interface control circuit 213 further identifies states of logical blocks assigned to the rewritable non-volatile memory module 220. The memory interface control circuit 213 may also identify states of physical blocks of the rewritable non-volatile memory module 220. More specifically, after the memory interface control circuit 213 sends read/write requests to the rewritable non-volatile memory module 220 according to read/write commands, the memory interface control circuit 213 identifies (determines) whether the storage unit (e.g., the physical block or a physical page, or the corresponding logical block or a logical page) of the rewritable non-volatile memory module 220 is in a readiness state.

In the present embodiment, the list management circuit 214 is configured to manage a list corresponding to the transmission command. The address of the data instructed to be transmitted by the transmission command is addressed in the host memory according to the information of the list.

Figure 2:
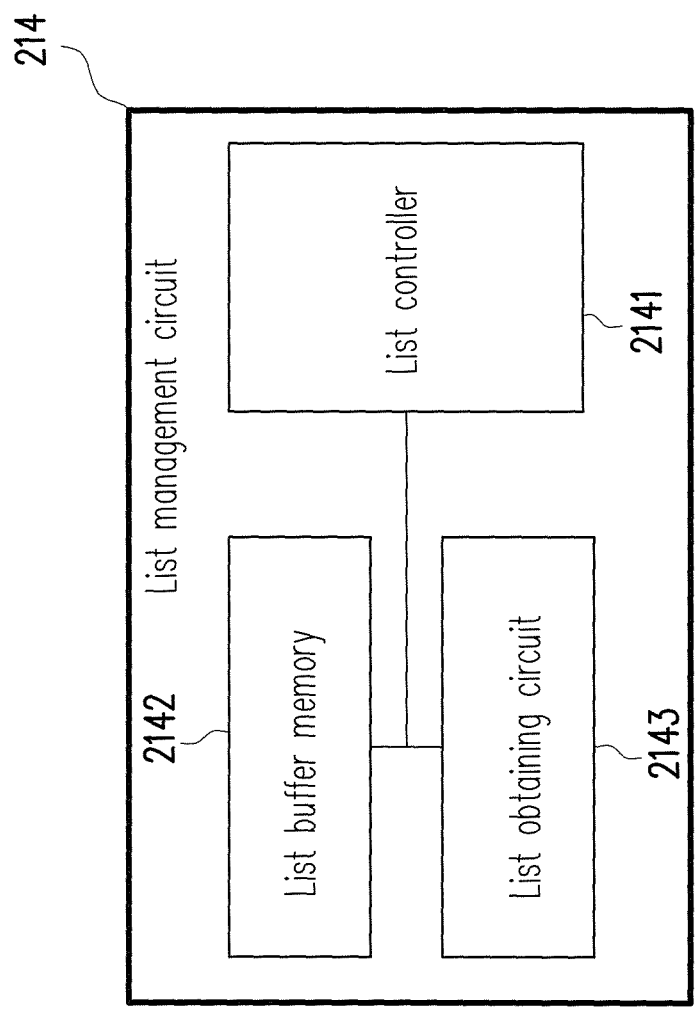
FIG. 2 is a block diagram illustrating a list management circuit according to an embodiment of the invention.

FIG. 2 is a block diagram illustrating a list management circuit according to an embodiment of the invention. Referring to FIG. 2, in the present embodiment, the list management circuit 214 includes a list controller 2141, a list buffer memory 2142 and a list obtaining circuit 2143. The list buffer memory 2142 is coupled to the list controller 2141. The list obtaining circuit 2143 is coupled to the list controller 2141.

The list controller 2141 is a hardware with computing capabilities, which is configured to control overall operation of the list management circuit 214. In the present embodiment, the list controller 2141 is, for example, a central processing unit (CPU), a micro-processor, other programmable microprocessors, a digital signal processor (DSP), a programmable controller, an application specific integrated circuits (ASIC), a programmable logic device (PLD) or other similar circuit elements, which are not particularly limited by the invention.

The list buffer memory 2142 is configured to temporarily store data and commands from the host memory 120 or the list controller 2141. The list buffer memory 2142 may be a Dynamic Random Access Memory (DRAM), or a Static Random Access Memory (SRAM) and the like. Nevertheless, it should be understood that the invention is not limited thereto, and the list buffer memory 2142 may also be other suitable memories.

The list obtaining circuit 2143 is configured to read (or fetch) the list from the host memory 120. The list controller 2141 may store (or buffer) the list read (fetched) by the list obtaining circuit 2143 into the list buffer memory 2142. Functions and operations of the elements of the list management circuit 214 in the invention are described in more detail with reference to various drawings and embodiments.

The rewritable non-volatile memory module 220 is coupled to the storage controller 210 and configured to store data written from the host system 10. The rewritable non-volatile memory module 220 may be a SLC (Single Level Cell) NAND flash memory module (i.e., a flash memory module capable of storing one bit in one memory cell), a MLC (Multi Level Cell) NAND flash memory module (i.e., a flash memory module capable of storing two bits in one memory cell), a TLC (Triple Level Cell) NAND flash memory module (i.e., a flash memory module capable of storing three bits in one memory cell), other flash memory modules or any memory module having the same features. The memory cells in the rewritable non-volatile memory module 220 are disposed in an array.

In the present embodiment, the memory cells of the rewritable non-volatile memory module 220 can constitute a plurality of physical programming units, and the physical programming units can constitute a plurality of physical blocks (also known as physical erasing units). Specifically, the memory cells on the same word line (or the same word line layer) can constitute one or more of the physical programming units. If each of the memory cells may be used to store two or more bits, the physical programming units on the same word line (or the same word line layer) may be at least classified into one lower physical programming unit and one upper physical programming unit.

In an embodiment, if each of the memory cells may be used to store two bits, the physical programming units on the same word line (or the same word line layer) may be classified into one lower physical programming unit and one upper physical programming unit. For instance, a least significant bit (LSB) of one memory cell belongs to the lower physical programming unit, and a most significant bit (MSB) of one memory cell belongs to the upper physical programming unit. Generally, a writing speed of the lower physical programming unit is higher than a writing speed of the upper physical programming unit, and/or a reliability of the lower physical programming unit is higher than a reliability of the upper physical programming unit.

In another embodiment, if each of the memory cells may be used to store three bits, the physical programming units on the same word line (or the same word line layer) may be classified into one lower physical programming unit, one upper physical programming unit and one extra physical programming unit. For example, a least significant bit (LSB) one memory cell belongs to the lower physical programming unit, a center significant bit (CSB) of one memory cell belongs to the upper physical programming unit, and a most significant bit (MSB) of one memory cell belongs to the extra physical programming unit.

In the present embodiment, the physical block is used as the storage unit for writing (programming) data. The physical block may also be referred to as the physical erasing unit or a physical unit. The physical erasing unit is the minimal unit for erasing. Namely, each physical erasing unit contains the least number of memory cells to be erased together. Each of the physical blocks has a plurality of physical programming units. The physical programming units are the physical page or a physical sector. When the physical programming units are the physical page, the physical programming units usually include a data bit area and a redundancy bit area. The data bit area includes multiple physical sectors configured to store user data, and the redundant bit area is configured to store system data (e.g., an error correcting code).

However, the invention is not limited herein. For example, in another embodiment, the data transmission method described in the present embodiment may also be modified and applied to the rewritable non-volatile memory module 220 in which the physical programming unit is the storage unit for writing data.

In an embodiment, the storage controller 210 manages the memory cells in the rewritable non-volatile memory module 220 based on the physical unit. For example, in the following embodiments, examples in which one physical block serves as one physical unit are provided. However, in another embodiment, one physical unit may also refer to a composition with any number of memory cells, depending on practical requirements. Further, it should be understood that, when the storage controller 211 groups the memory cells (or the physical units) in the rewritable non-volatile memory module 220 for the corresponding management operations, the memory cells (or the physical units) are logically grouped but their actual locations are not changed.

The storage controller 210 assigns a plurality of logical units for mapping to a plurality of physical units of the rewritable non-volatile memory module 220 for storing the user data, and the host system 10 accesses the user data stored in the physical units for storing the user data through the logical units. Herein, each of the logical units may be constituted by one or more logic addresses. For example, the logic unit may be a logical block, a logical page or a logical sector. One logical unit may be mapped to one or more physical units, where the physical unit may be one or more physical addresses, one or more physical sectors, one or more physical programming units, or one or more physical erasing units. In the present embodiment, the logical unit is the logical block.

In addition, the storage controller 210 establishes a logical to physical address mapping table and a physical to logical address mapping table to record a mapping relation between the logical unit (e.g., the logical block, the logical page or the logical sector) assigned to the rewritable non-volatile memory module 220 and the physical unit (e.g., the physical erasing unit, the physical programming unit or the physical sector). In other words, the storage controller 210 may look up for the physical unit mapped to one logical unit by using the logical to physical address mapping table, and the storage controller 210 may look up for the logical unit mapped to one physical unit by using the physical to logical address mapping table. Nonetheless, the technical concept for the mapping relation between the logical unit and the physical unit is a well-known technical means in the field, which is not repeated hereinafter.

In an embodiment, the storage controller 210 further includes a buffer memory and a power management circuit. The buffer memory is coupled to the processor 211 and configured to temporarily store data and commands from the host system 10, data from the rewritable non-volatile memory module 220 or other system data for managing the storage device 20. The power management circuit is coupled to the processor 211 and configured to control power of the storage device 20.

In the present embodiment, a data transfer command corresponding to the NVMe interface standard is also known as an NVMe I/O command. In which, the NVMe I/O command may also be divided into an NVMe I/O read command and an NVMe I/O write command. Main fields in a command description of the NVMe I/O command are a starting logical block address (SLBA), a number of logical blocks (NLB), a first physical region page pointer (Physical Region Page Pointer 1; PRP1) and a second physical region page pointer (Physical Region Page Pointer 2; PRP2).

The starting logical block address is configured to indicate an address (at the maximum of 64-bit). Said address is an address of a foremost (first) logical block sorted within a range of addresses of the logical blocks for the data transfer. The number of logical blocks is configured to indicate a total number of the logical blocks within the range of addresses of the logical blocks for the data transfer.

It should be noted that, in the present embodiment, when a value of the number of logical blocks is "0", it means that the number of logical blocks is "1". In other words, the total number of the logical blocks within the range of addresses of the logical blocks for the data transfer is the value of the number of logical blocks plus one.

The range of (addresses of) the logical blocks for the data transfer may be obtained with the combination of the starting logical block address and the number of logical blocks. For instance, it is assumed that the rewritable non-volatile memory module 220 is currently assigned with six logical blocks LBA(0) to LBA(5). When the NVMe I/O command (e.g., with the command description in which SLBA="LBA(0)" and NLB="2") is received, it can be known that the starting logical block address corresponds to the logical block LBA(0), the logical block LBA(0) is the foremost logical block sorted in the logical blocks to be accessed, and the number of logical blocks indicates that the total number of the logical blocks to be accessed is three. In other words, the NVMe I/O command in this example may represent the data access (transfer) with the logical blocks LBA(0) to LBA(2) as targets.

The first physical region page pointer and the second physical region page pointer are configured to indicate memory page addresses in the host memory. The memory page addresses are configured to indicate source (corresponding to the write command)/destination (corresponding to the read command) of the data access. Detailed specification for each field in the command description of the NVMe interface standard belongs to the prior art, which is not repeated hereinafter.

The data transmission method corresponding to the data transmission commands of the NVMe interface standard provided in the embodiments of the invention will be described below with reference to FIG. 1 and the subsequent drawings.

Figure 3:
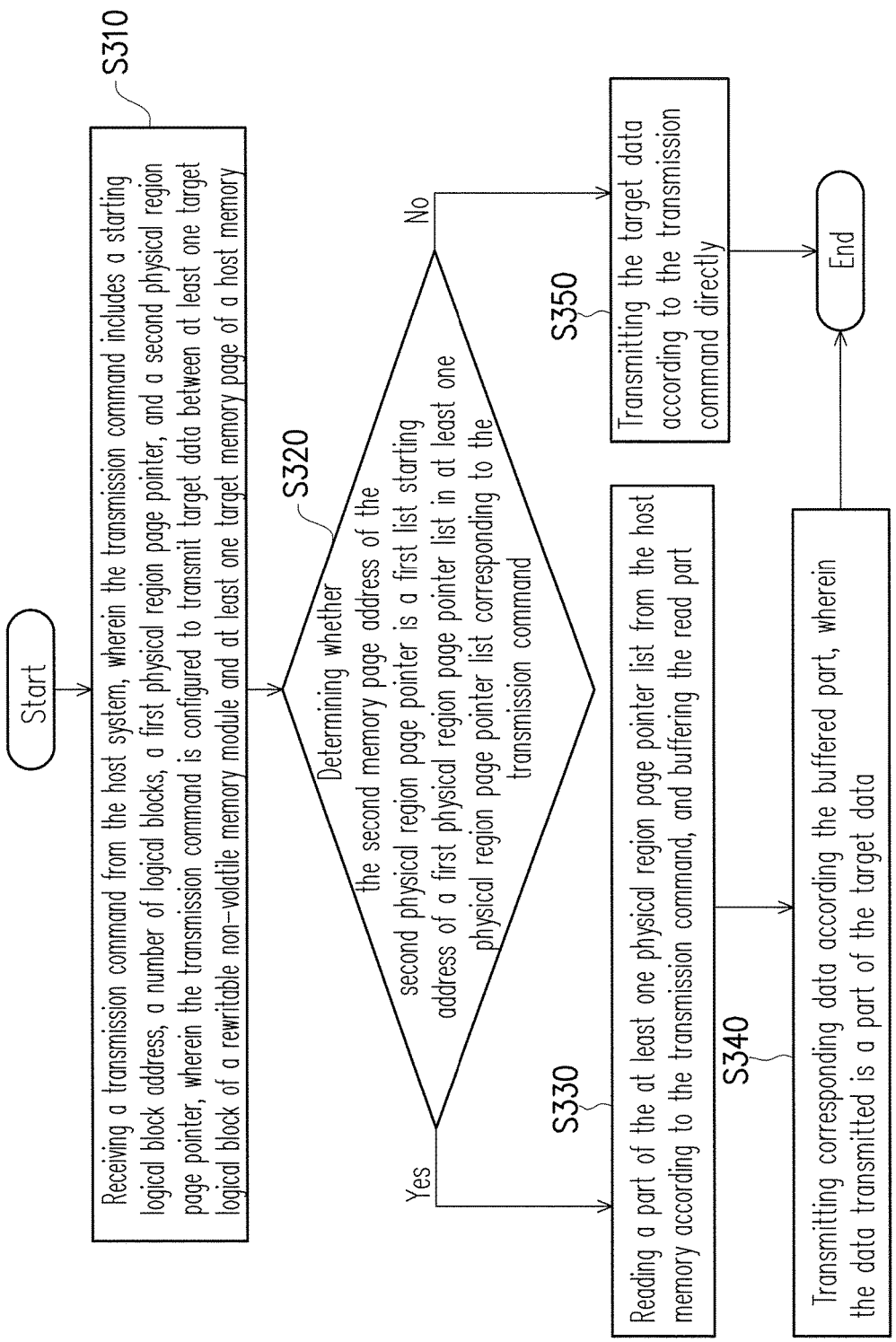
FIG. 3 is a flowchart illustrating a data transmission method according to an embodiment of the invention.

FIG. 3 is a flowchart illustrating a data transmission method according to an embodiment of the invention. In the present embodiment, referring to FIG. 1 and FIG. 3 together, in step S310, the processor 211 receives a transmission command from the host system 10, wherein the transmission command includes a starting logical block address, a number of logical blocks, a first physical region page pointer, and a second physical region page pointer, wherein the transmission command is configured to transmit target data between at least one target logical block of a rewritable non-volatile memory module and at least one target memory page of a host memory.

Specifically, the host system 10 gives a plurality of read commands or write commands to the storage controller 210 of the storage device 20 in order to access the data in the storage device 20. After receiving (or reading) the read/write commands given by the host system 10, the storage controller 210 performs the data reading/writing operation for the rewritable non-volatile memory module 220 in the storage device 20.

For instance, in an embodiment, it is assumed that the processor 110 of the host system 10 divides the host memory 120 into a temporary data area and a command queue area, and the storage controller 210 further includes a command management unit. The command management unit is, for example, a circuit element having a command buffer, a command status register and a command fetching circuit. The host system 10 stores the read commands or the write commands to the command queue area of the host memory 120, and the command fetching circuit reads the read/write commands from the command queue area and stores the read commands to the command buffer. The processor 211 may select the command to be processed according to a firmware or software predetermined rule. Next, the processor 211 executes the selected command, and instructs the memory interface control circuit 213 to perform the corresponding data transmission operation for the rewritable non-volatile memory module 220 according to the selected command (e.g., the NVMe I/O command). However, the invention is not limited only to aforementioned method in which the storage controller 210 receives the read/write commands from the host system 10.

In the present embodiment, the storage controller 210 may also prefetch or fetch data/information corresponding to the transmission command in the temporary data area of the host memory 120. For instance, the list management circuit 214 of the storage controller 210 may fetch the list (e.g., Physical Region Page Pointer List; PRPL) stored in the host memory 120 corresponding to the transmission command, and store the list into the list management circuit 214.

As described above, the transmission command is, for example, the NVMe I/O read command, which includes the starting logical block address, the number of logical blocks, the first physical region page pointer, and the second physical region page pointer. Among them, the range of addresses of (at least one) logical block (also known as a target logical block) to be read from the rewritable non-volatile memory module 220 may be obtained through the starting logical block address and the number of logical blocks; and at least one memory page address (e.g., a first memory page address indicated by the first physical region page pointer and a second memory page address indicated by the second physical region page pointer) may be obtained through the first physical region page pointer and the second physical region page pointer. Further, the storage controller 210 may store data (also known as the target data) read from the target logical block through the first memory page address and the second memory page address.

As another example, the transmission command is, for example, the NVMe I/O write command, which includes the starting logical block address, the number of logical blocks, the first physical region page pointer, and the second physical region page pointer. Among them, the range of addresses of (at least one) logical block (also known as a target logical block) to be written from the rewritable non-volatile memory module 220 may be obtained through the starting logical block address and the number of logical blocks; and at least one memory page address (e.g., a first memory page address indicated by the first physical region page pointer and a second memory page address indicated by the second physical region page pointer) may be obtained through the first physical region page pointer and the second physical region page pointer. Further, the storage controller 210 may read data (also known as the target data) corresponding to the write command through the first memory page address and the second memory page address, and write the data into a corresponding target logical block. In other words, according to instruction of the write command, the storage controller 210 can read the target data from the at least one target memory page of the host memory 120 and write the read target data into the at least one target logical block of the rewritable non-volatile memory module 220.

In an embodiment, the data transfer management circuit 212 calculates information for the data transfer according to the starting logical block address, the number of logical blocks, the first physical region page pointer, and the second physical region page pointer, and identifies the address of the memory page (also known as the target memory page) in the host memory corresponding to the target logical blocks among (within the range of) the target logical blocks.

Further, in step S320, the data transfer management circuit 212 determines whether the second memory page address of the second physical region page pointer is a first list starting address of a first physical region page pointer list in at least one physical region page pointer list corresponding to the transmission command. In the following, the related details are illustrated with FIG. 4 and FIG. 5.

Figure 4:
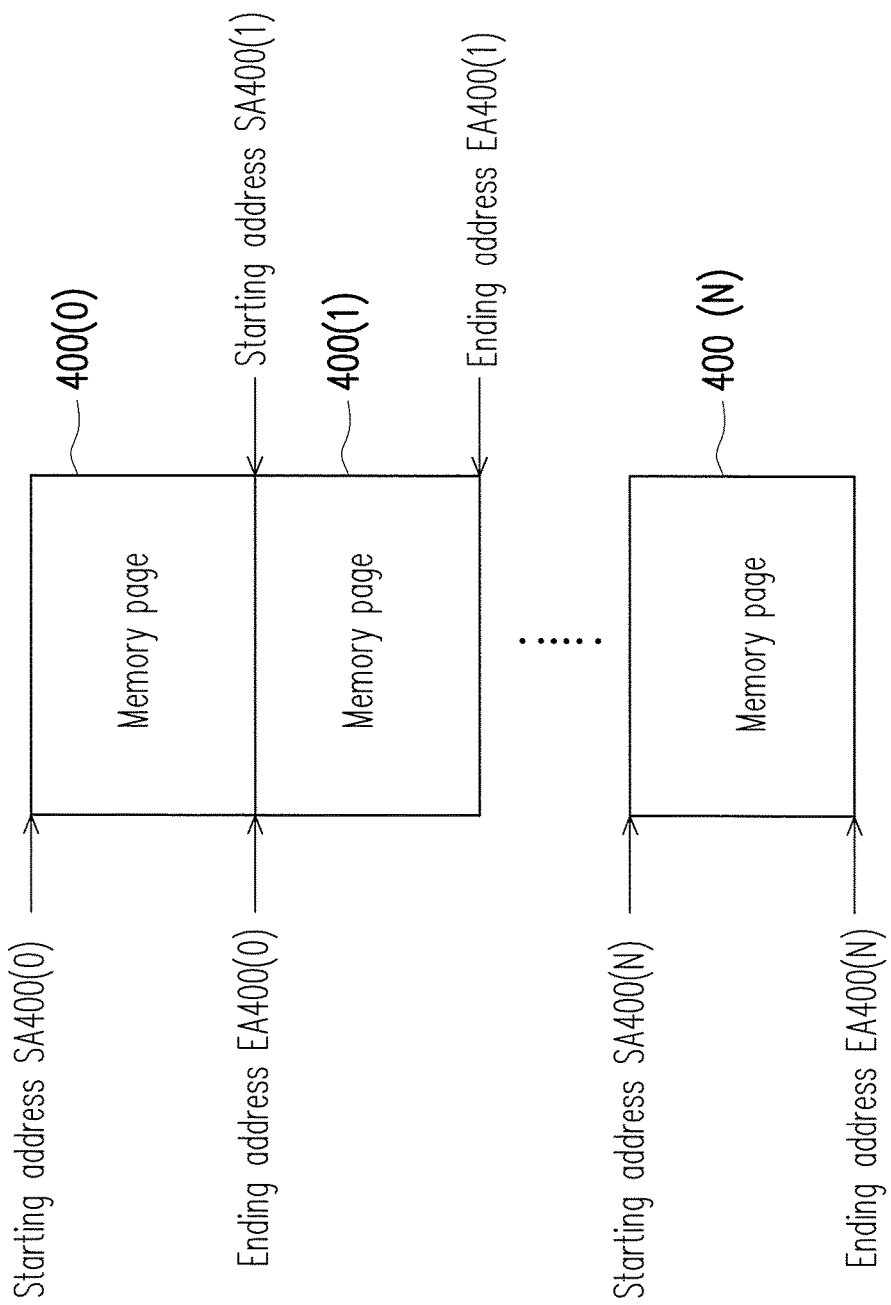
FIG. 4 is a schematic diagram illustrating memory pages according to an embodiment of the invention.

FIG. 4 is a schematic diagram illustrating memory pages according to an embodiment of the invention. Referring to FIG. 4, it is assumed that the host memory 120 is divided into a plurality of memory pages 400(0) to 400(N). N" is, for example, a positive integer being 15. Among them, as shown in the drawing, the memory pages 400(0), 400(1), . . . , 400(N) have the starting addresses SA400(0), SA400(1), . . . , SA400(N) and the ending addresses EA400(0), EA400(1), . . . , EA400(N), respectively. If the memory pages are addressed in hexadecimal notation, the starting address SA400(0) is "0000"; the starting address SA400(1) is "1000"; and the starting address SA400(N) is "F000". The ending address EA400(0) is "0FFF"; the ending address EA400(1) is "1FFF"; and the ending address EA400(N) is "FFFF". In this example, a size of each of the memory pages 400(0) to 400(N) is 4096 bytes.

Figure 5:
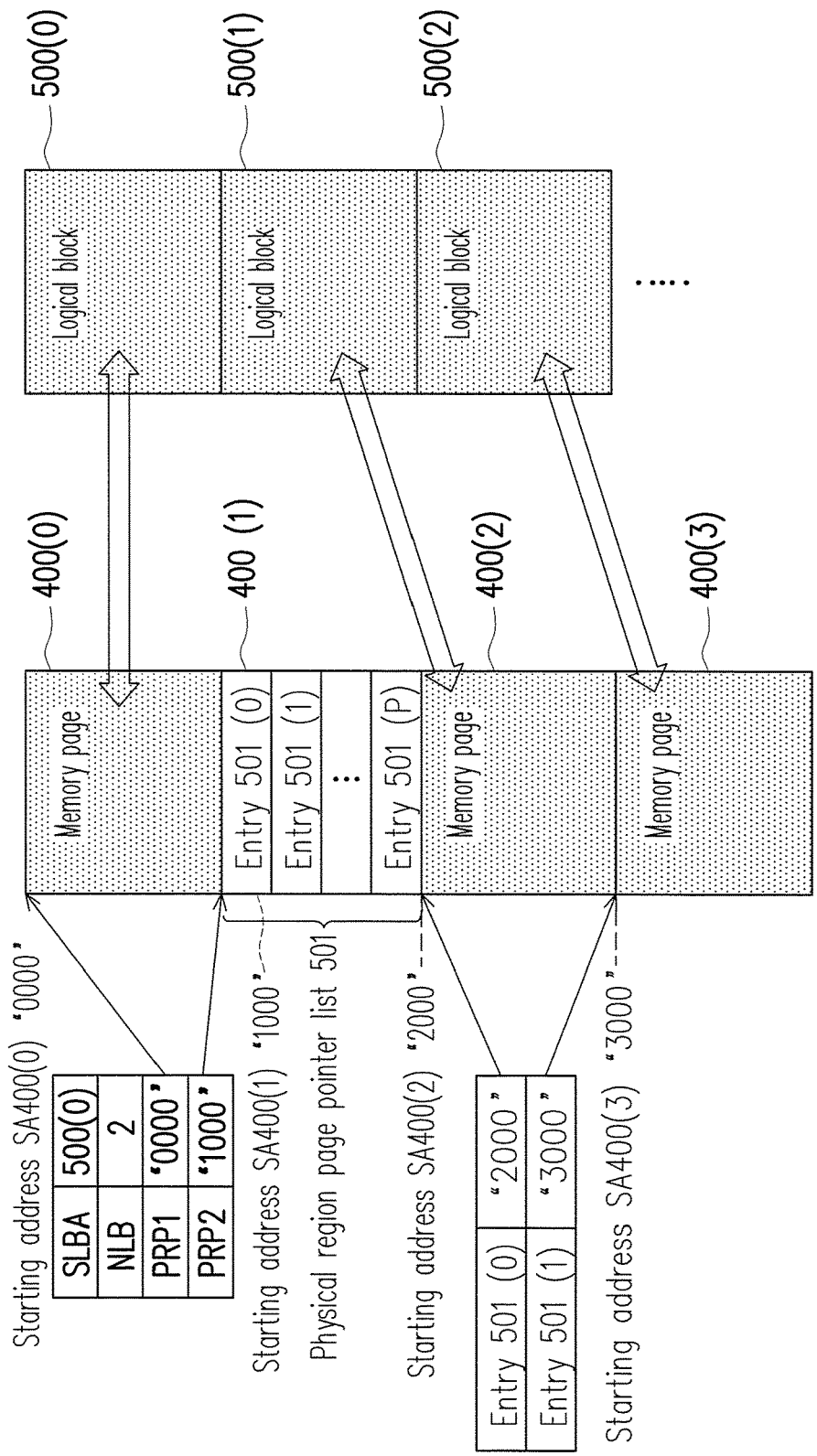
FIG. 5 is a schematic diagram illustrating a data transfer according to an embodiment of the invention.

FIG. 5 is a schematic diagram illustrating a data transfer according to an embodiment of the invention.

Referring to FIG. 5, the memory pages 400(0) to 400(N) are identical to the above, which are not repeated hereinafter. Further, the rewritable non-volatile memory module 220 is assigned with logical blocks 500(0) to 500(M), where "M" is a positive integer with a size configured based on demands of the manufacturers. For illustrative convenience, in the present embodiment, a size of (each of) the logical block is 4096 bytes. As shown by the left table in FIG. 5, it is assumed in the transmission command received from the host system 10, a value of the starting logical block address (SLBA) is "500(0)", a value of the number of logical blocks (NLB) is "2", a value of the first physical region page pointer (PRP1) is "0000", and a value of the second physical region page pointer (PRP2) is "1000". For illustrative convenience, the transmission command is taken as a read command in the following description.

In the present embodiment, the data transfer management circuit 212 determines whether use of the second physical region page pointer (PRP2) is required according to a size of each logical block (logical block size; LBS) in the logical blocks 500(0) to 500(M), a size of each memory page (memory page size; MPS) in the memory pages 400(0) to 400(N), the starting logical block address, the number of logical blocks, and the first physical region page pointer (PRP1).

For instance, according to the transmission command (read command) of FIG. 5, is can be known that the (range of) target logical blocks are logical blocks 500(0) to 500(2), and the size of the target data is 12288 bytes (e.g., 4096 (bytes)*3=12288 (bytes)). The data transfer management circuit 212 determines the ending address (e.g., "0FFF") of the memory page (e.g., the memory page 400(0)) to which the first memory page address (e.g., "0000") belongs, and uses a space between the ending address and the first memory page address as an initial memory page space. The data transfer management circuit 212 identifies a size of the initial memory page space as 4096 bytes (e.g., "0FFF"– "0000"+1="1000" (in hexadecimal)=4096 (in decimal)).

Next, the data transfer management circuit 212 determines whether the size of the target data is greater than the size of the initial memory page space. In this example, since the size of the target data is greater than the size of the initial memory page space (12288>4096), the data transfer management circuit 212 determines that use of the second physical region page pointer (PRP2) is required.

Further, after determining that use of the second physical region page pointer (PRP2) is required, the data transfer management circuit 212 determines whether the information of the second memory page address indicated by the second physical region page pointer (PRP2) is indicating the list starting address of the physical region page pointer list (PRP list). Specifically, after the target data is written into the initial memory page space, if the size of the remaining target data is greater than the size of one memory page, use of multiple memory pages is required to store the remaining target data. In this case, the second memory page address of the second physical region page pointer (PRP2) is used to indicate the list starting address of one physical region page pointer list (PRP list). The physical region page pointer list includes a plurality of entries. Each entry among the entries records the starting address of different memory pages. It should be noted that, if the difference between the size of the target data and the size of the initial memory page is not greater than the size of one memory page, the data transfer management circuit 212 determines the second memory page address of the second physical region page pointer is not the list starting address of the physical region page pointer list (PRP list) but a starting address of one memory page (for storing the remaining target data).

More specifically, the data transfer management circuit 212 calculates a difference obtained from the size of the target data minus the size of the initial memory page space, and determines whether the difference is greater than the size of one memory page. The difference may also represent the remaining target data (not yet stored in the host memory) after the initial memory page space is fully written. If the difference is greater than the size of one memory page, the data transfer management circuit 212 then identifies the second memory page address of the second physical region page pointer as the list starting address of the physical region page pointer list (PRP list) since the physical region page pointer list is required to record the starting addresses of two or more memory pages for storing the remaining target data. It should be noted that, the list starting address indicates the starting address of the first one (foremost) entry (e.g., an entry 501(0)) in the physical region page pointer list, and the list starting address does not have to be the starting address of the memory page.

In the present embodiment, the data transfer management circuit 212 uses a value of a quotient obtained from the difference divided by the size of the each of the memory pages (MPS) and rounded up to decimal places to be the number of the entries recorded in the physical region page pointer list. In other words, the data transfer management circuit 212 determines how many memory pages (excluding the initial memory page space) are still required for storing the target data, and correspondingly records the starting addresses of the memory pages (excluding the initial memory page space) for storing the target data in sequence into the entries in the physical region page pointer list. A size of each entry may be a space suitable for recording address information, which is not particularly limited in the invention.

It should be noted that, a maximum capacity of each physical region page pointer list is the size of one memory page. In other words, a maximum number of entries recordable by the physical region page pointer list is a quotient obtained from the size of one memory page divided by the size of each entry. The size of each physical region page pointer list is a size of a space between the corresponding list starting address and the ending address of the memory page to which the physical region page pointer list belongs. For example, a physical region page pointer list 501 may include entries 501(0) to 501(P), where P is a positive integer.

In an embodiment, if the number of the memory pages (excluding the initial memory page space) for storing the target data exceeds the maximum number of entries recordable by one physical region page pointer list, the data transfer management circuit 212 identifies that the last entry of said physical region page pointer list is to be used for recording a starting address of (subsequent) another physical region page pointer list. Accordingly, the data transfer management circuit 212 can proceed to obtain the starting addresses of the other memory pages by reading said another physical region page pointer list.

In this example, the target logical blocks to be read as instructed by the read command are the target logical blocks 500(0) to 500(2). Also, according to the first memory page address (e.g., "0000") indicated by the first physical region page pointer, it can be known that the target data stored in the logical block 500(0) will be written starting from the memory page address being "0000" in the memory page 400(0) of the host memory 120. For the other part of the target data in addition to the target data to be written into the initial memory page space, the data transfer management circuit 212 reads the entries in the physical region page pointer list 701 starting from the second memory page address being"1000" (e.g., the starting address SA400(1) shown in FIG. 5) according to the second memory page address (e.g., "1000") indicated by the second physical region page pointer, so as to obtain the addresses of the memory pages to which the other part of the target data is to be stored.

In the present embodiment, the size of the target data is a size of three logical blocks (NLB is "2"), which is 12288 bytes. Excluding the part of the target data (with the size of 4096 bytes, stored in the logical block 500(0)) to be written into the initial memory page, two memory pages are required for storing the other part of the target data (with the size of 8192 bytes, stored in the logical blocks 500(1) and 500(2)). Accordingly, the addresses recorded in the entries 501(0) and 501(1) in the physical region page pointer list 501 corresponds to two starting addresses of the memory pages of the logical blocks 500(1) and 500(2) (as shown in FIG. 5, the starting address SA400(2) "2000" and the starting address SA400(3) "3000" recorded in the entries 501(0) and 501(1), respectively).

Referring to FIG. 3 again. It is noted that, in the present embodiment, if the data transfer management circuit 212 determines the second memory page address is the first list starting address of the first physical region page pointer list of the at least one physical region page pointer list corresponding to the transmission command in step S320, the list management circuit 214 may read a part of the at least one physical region page pointer list from the host memory according to the transmission command, and buffer the read part in step S330. In the following, details of the step S330 are illustrated with FIG. 6.

Figure 6:
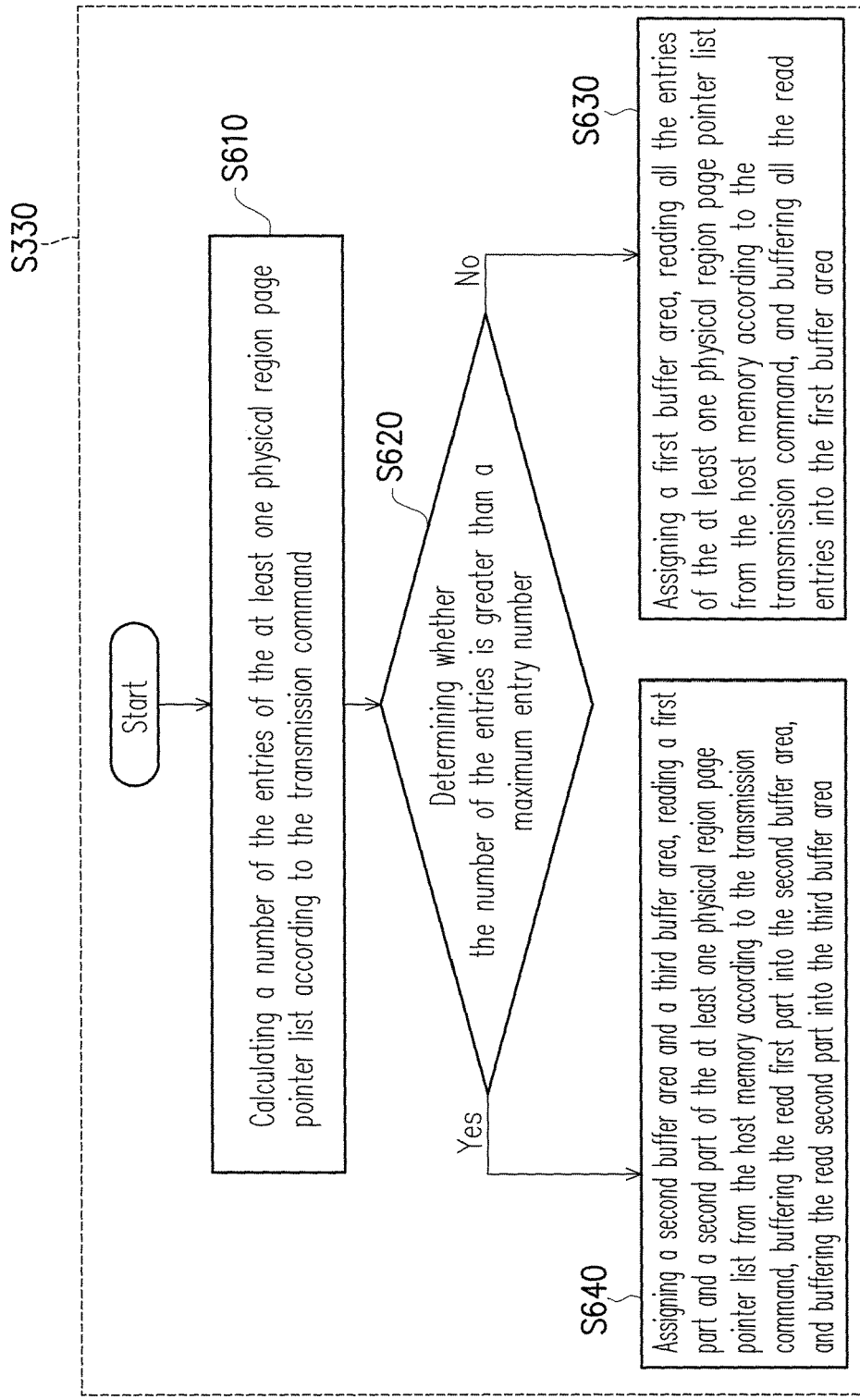
FIG. 6 is a flowchart illustrating buffering the physical region page pointer list according to an embodiment of the invention.

FIG. 6 is a flowchart illustrating buffering the physical region page pointer list according to an embodiment of the invention. Referring to FIG. 6, the step S330 includes the steps S610, S620, S630 and S640. In step S610, the list controller 2141 calculates a number of the entries of the at least one physical region page pointer list according to the transmission command. In the following, details of calculating the number of the entries of the at least one physical region page pointer list are illustrated with FIG. 7.

Figure 7:
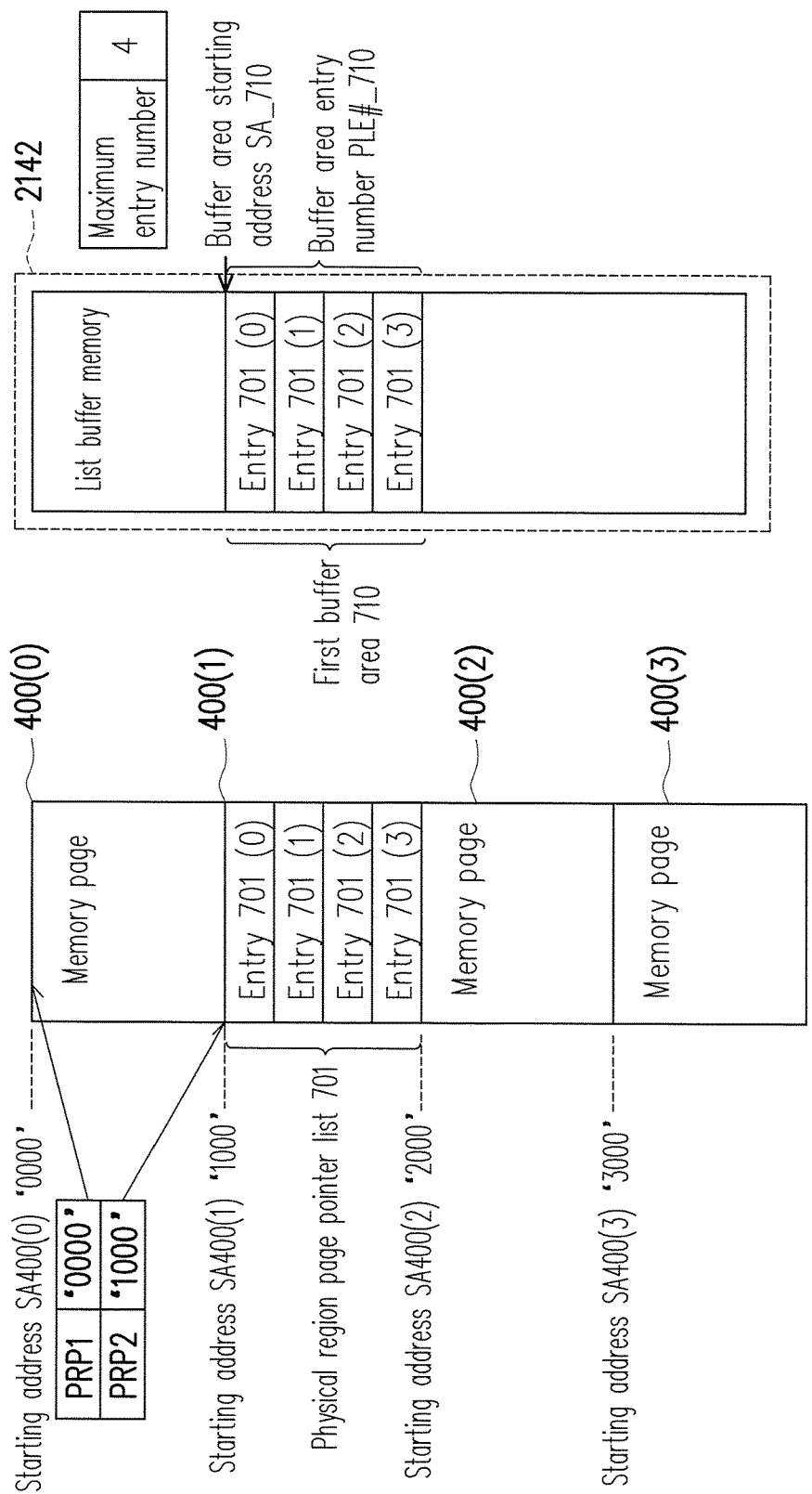
FIG. 7 is a schematic diagram illustrating buffering the physical region page pointer list according to an embodiment of the invention.

FIG. 7 is a schematic diagram illustrating buffering the physical region page pointer list according to an embodiment of the invention. Referring to FIG. 7, it is assumed that 4 entries are stored in each memory page for illustrative convenience (e.g., the size of each entry is quarter of the memory page). It is assumed in the transmission command received from the host system 10, a value of the starting logical block address (SLBA) is "500(0)", a value of the number of logical blocks (NLB) is "4", a value of the first physical region page pointer (PRP1) is "0000", and a value of the second physical region page pointer (PRP2) is "1000". It can be known that (the range of) the target logical blocks are the logical blocks 500(0) to 500(4), the size of the target data is 20480 bytes (e.g., 4096 (bytes)*5=20480 (bytes)) and the size of the initial memory page space is 4096 bytes. As described above, it is determined that use of the second physical region page pointer is required, and the second physical region page pointer is indicating the memory page starting address SA400(1) of the physical region page pointer list 701.

The list controller 2141 divides a difference of the size of the target data and the initial memory space by each memory page size (MPS) in order to obtain a value of a quotient, and rounds up the value of the quotient to decimal places to obtain a number of the other target memory pages for transmitting target data, which is the number of the entries in the physical region page pointer list. The number is not counted in a number of the entries used for pointing the starting addresses of the other physical region page pointer lists. In other words, the list controller 2141 determines how many memory pages (excluding the initial memory page space) are still required for storing the target data, and calculates (excluding the initial memory page space) a number of the entries for recording the target memory pages for transmitting target data.

For example, in the example of FIG. 7, the physical region page pointer list 701 has 4 entries 701(0) to 701(3) for recording addresses of the target memory pages. In other words, the list controller 2141 may calculate the number of the entries of the physical region page pointer list 701 is "4".

Next in step S620, the list controller 2141 determines whether the number of the entries is greater than a maximum entry number. Specifically, the manufacturer may set a preset maximum entry number, which is configured to limit the size of the buffer area corresponding to one transmission command in the list buffer memory 2142, where the buffer area is assigned to store the entries of the physical region page pointer list. In an embodiment, the list controller 2141 may dynamically determine the value of the maximum entry number according to different conditions. In the example of FIG. 7, the maximum entry number is set as "4". In other words, a buffer area is assigned in the list buffer memory 2142 corresponding to the transmission command of FIG. 7, and the maximum number of the recordable entries is "4".

If the list controller 2141 determines that the number is not greater than the maximum entry number in step S620, the list controller 2141 may then assign a first buffer area, instruct the list obtaining circuit 2143 to read all the entries of the at least one physical region page pointer list from the host memory 120 according to the transmission command, and buffer all the read entries into the first buffer area in step S630.

For example, in the example of FIG. 7, the number of the entries of the physical region page pointer list 701 (e.g., "4") is not greater than the maximum entry number (e.g., "4"). The list controller 2141 may assign a buffer area 710 (also referred as first buffer area) to store all the entries 701(0) to 701(3) of the physical region page pointer list 701. The list controller 2141 may indicate the buffer area starting address SA_710 of the first buffer area 710 to assign the starting position of the first buffer area 710, and indicate a buffer area entry number PLE#_710 of the first buffer area 710, in order to assign the size of the first buffer area 710. In the example of FIG. 7, a value of the buffer area entry number PLE#_710 is "4", which means that the first buffer area 710 is assigned to store 4 entries.

In addition, the list controller 2141 may instruct the list obtaining circuit 2143 to read all the entries 701(0) to 701(3) of the physical region page pointer list 701 from the host memory 120 according to the transmission command. Next, the list controller 2141 may buffer all of the read entries 701(0) to 701(3) into the first buffer area 710.

In step S620, if the list controller 2141 determines that the number of the entries is greater than the maximum entry number, enter step S640. The list controller 2141 assigns a second buffer area and a third buffer area, the list controller 2141 instruct the list obtaining circuit 2143 to read a first part and a second part of the at least one physical region page pointer list from the host memory according to the transmission command, the list controller 2141 buffers the read first part into the second buffer area, and buffers the read second part into the third buffer area. In the following, it is illustrated with FIG. 8 and FIG. 9.

Figure 8:
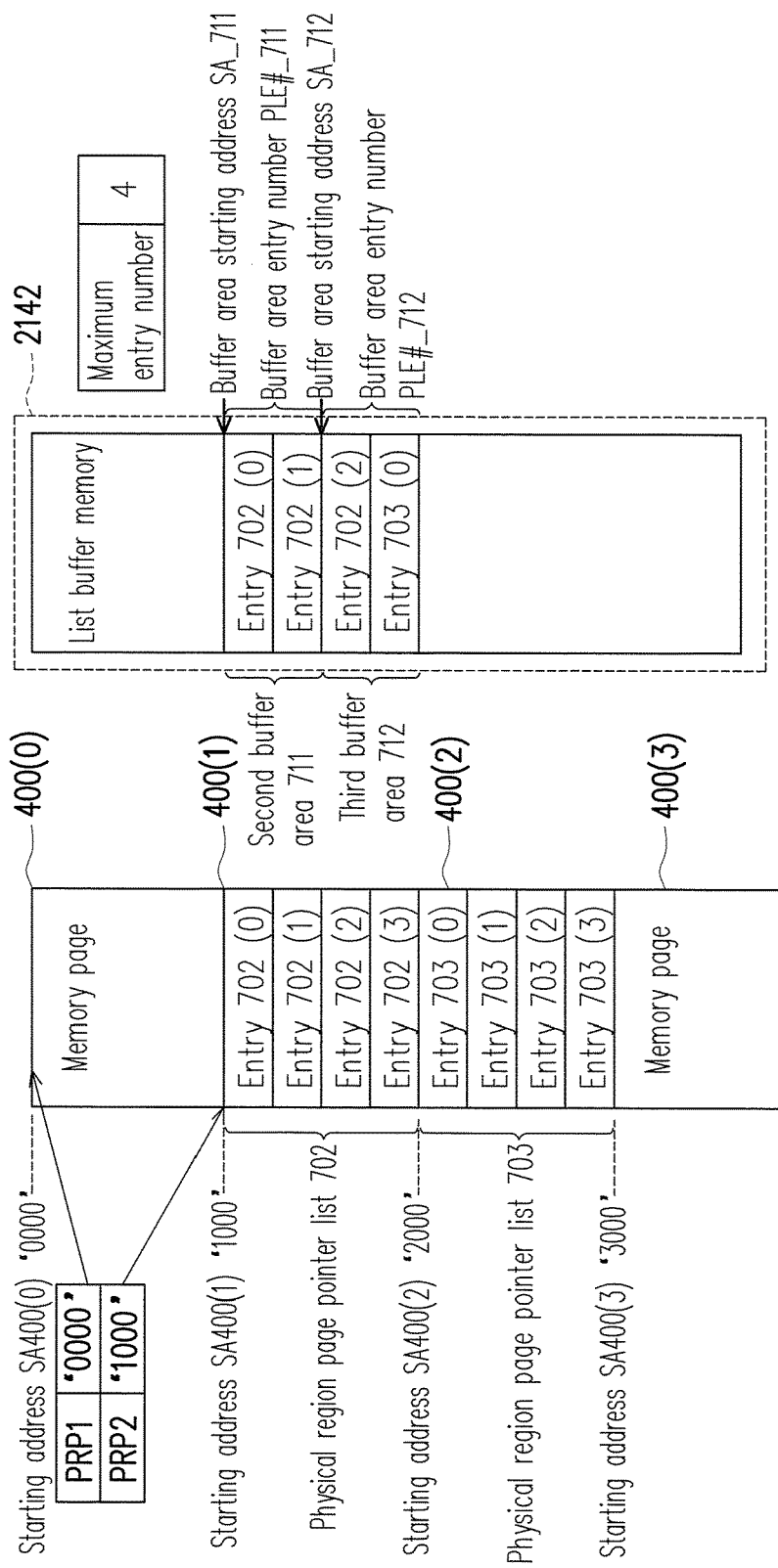
FIG. 8 is a schematic diagram illustrating buffering the physical region page pointer list according to an embodiment of the invention.

FIG. 8 is a schematic diagram illustrating buffering the physical region page pointer list according to an embodiment of the invention. Referring to FIG. 8, it is assumed that 4 entries are stored in each memory page for illustrative convenience (e.g., the size of each entry is quarter of the memory page). It is assumed in the transmission command received from the host system 10, a value of the starting logical block address (SLBA) is "500(0)", a value of the number of logical blocks (NLB) is "7", a value of the first physical region page pointer (PRP1) is "0000", and a value of the second physical region page pointer (PRP2) is "1000". It can be known that (the range of) the target logical blocks are the logical blocks 500(0) to 500(7), the size of the target data is 32768 bytes (e.g., 4096 (bytes)*8=32768 (bytes)) and the size of the initial memory page space is 4096 bytes. As described above, it is determined that use of the second physical region page pointer is required, and the second physical region page pointer is indicating the memory page starting address SA400(1) of the physical region page pointer list 702. It should be noted that the size of each entry is not limited in the invention.

The list controller 2141 determines seven memory pages (excluding the initial memory page space) are still required for storing the target data, and calculates (excluding the initial memory page space) the number of the entries for recording the target memory pages for transmitting target data is seven.

For example, in the example of FIG. 8, the physical region page pointer list 702 has 3 entries 702(0) to 703(2) for recording addresses of the target memory pages, and has one entry 702(3) for recording the starting address of the physical region page pointer list 703. The physical region page pointer list 703 has 4 entries 703(0) to 703(3) for recording addresses of the target memory pages.

Briefly, the list controller 2141 calculates the number (also referred as first number) of the entries stored in the physical region page pointer lists 702 and 703, then calculates the number (also referred as second number) of the physical region page pointer lists. According to the number of the physical region page pointer list, the list controller 2141 identifies the number (also referred as third number) of the entries used for recording the start addresses of the physical region page pointer lists. In this example, the list controller 2141 subtracts the third number from the first number to obtain the number of the entries of the physical region page pointer list 702 and 703 is "7" (e.g., the first number−(the second number−1)=the first number−the third number=8−1=7).

Next, the list controller 2141 assigns two buffer areas in the list buffer memory to store the entries, which are the second buffer area 711 and the third buffer area 712. For example, the list controller 2141 may indicate the buffer area starting address SA_711 of the second buffer area 711 to assign the starting address of the second buffer area 711, and indicate a buffer area entry number PLE#_711 of the second buffer area 711, in order to assign the size of the second buffer area 711. Similarly, the list controller 2141 may indicate the buffer area starting address SA_712 of the third buffer area 712 to assign the starting address of the third buffer area 712, and indicate a buffer area entry number PLE#_712 of the third buffer area 712, in order to assign the size of the third buffer area 712.

It is noted that in the present embodiment, a summation of the buffer area entry number PLE#_711 of the second buffer area 711 and the buffer area entry number PLE#_712 of the third buffer area 712 is equal to the maximum entry number (e.g., "4"). In addition, the buffer area entry number PLE#_711 (e.g., "2") of the second buffer area 711 is equal to the buffer area entry number PLE#_712 (e.g., "2") of the third buffer area 712. It should be noted that, in other embodiments, the list controller 2141 may also assign more than two buffer areas in the list buffer memory 2142 corresponding to one transmission command.

In addition, the list controller 2141 may instruct the list obtaining circuit 2143 to read a first part and a second part of physical region page pointer lists 702 and 703 from the host memory 120 according to the transmission command. Specifically, referring to the right table in FIG. 10, the list controller 2141 groups the entries 702(0) to 702(2) and the entries 703(0) to 703(3) used for recording the target memory pages in the physical region page pointer lists 702 and 703 into multiple parts. In the present embodiment, a total number of the entries in each part is corresponding to the buffer area entry number of the second buffer area or the third buffer area. For example, the buffer area entry number of the second buffer area 711 and the third buffer area 712 is "2". Accordingly, the number of the entries in each part of the physical region page pointer lists 702 and 703 is not greater than 2. In this example, the list controller 2141 groups the entries 702(2) to 702(2) and the entries 703(0) to 703(3) used for recording the target memory pages in the physical region page pointer lists 702 and 703 into a first part to a fourth part. In which, the first part is the entries 702(0), 702(1); the second part is the entries 702(2), 703(0); the third part is the entries 703(1), 703(2); the fourth part is the entries 703(3).

Next, the list controller 2141 may instruct the list obtaining circuit 2143 to read the first part (e.g., the entries 702(0), 702(1)) and the second part (e.g., the entries 702(2), 703(0)) of the physical region page pointer lists 702 and 703 from the host memory 120 according to the transmission command. Specifically, the list obtaining circuit 2143 locates the memory page addresses of the first part (e.g., the entries 702(0), 702(1)) and the second part (e.g., the entries 702(2), 703(0)) according to the transmission command, in order to read the content (e.g., the starting addresses of the corresponding memory pages) recorded in the first part and the second part.

After completely reading the first part and the second part, the list controller 2141 stores (buffers) the read first part into the second buffer area of the list buffer memory 2142, and stores (buffers) the read second part into the third buffer area of the list buffer memory 2142.

Referring back to FIG. 3, after the step of buffering the physical region page pointer list (S330) is completed, step S340 is entered, the data transfer management circuit 212 transmits corresponding data according the buffered part, where the data transmitted is a part of the target data. Specifically, the data transfer management circuit 212 determines the corresponding target logical block according to the entries stored in the list buffer memory 2142, in order to perform the transmission operation (e.g., read/write operation) of the target data between the target memory page and the target logical block corresponding to the entries. It should be noted that, if all of the entries of the physical region page pointer list corresponding to one transmission command are buffered into the list buffer memory together (as the example of FIG. 7), the data transfer management circuit 212 performs the corresponding data transmission operation according to all of the entries buffered in the list buffer memory 2142.

In the present embodiment, the list controller 2141 can assign buffer areas to different transmission commands in the list buffer memory 2142. The list controller 2141 may set the size of each buffer area by the maximum entry number. The size of each buffer area may be equal or not equal to the corresponding maximum entry number. The maximum entry number is a positive integer. The maximum entry number is preferably an even number.

Figure 9:
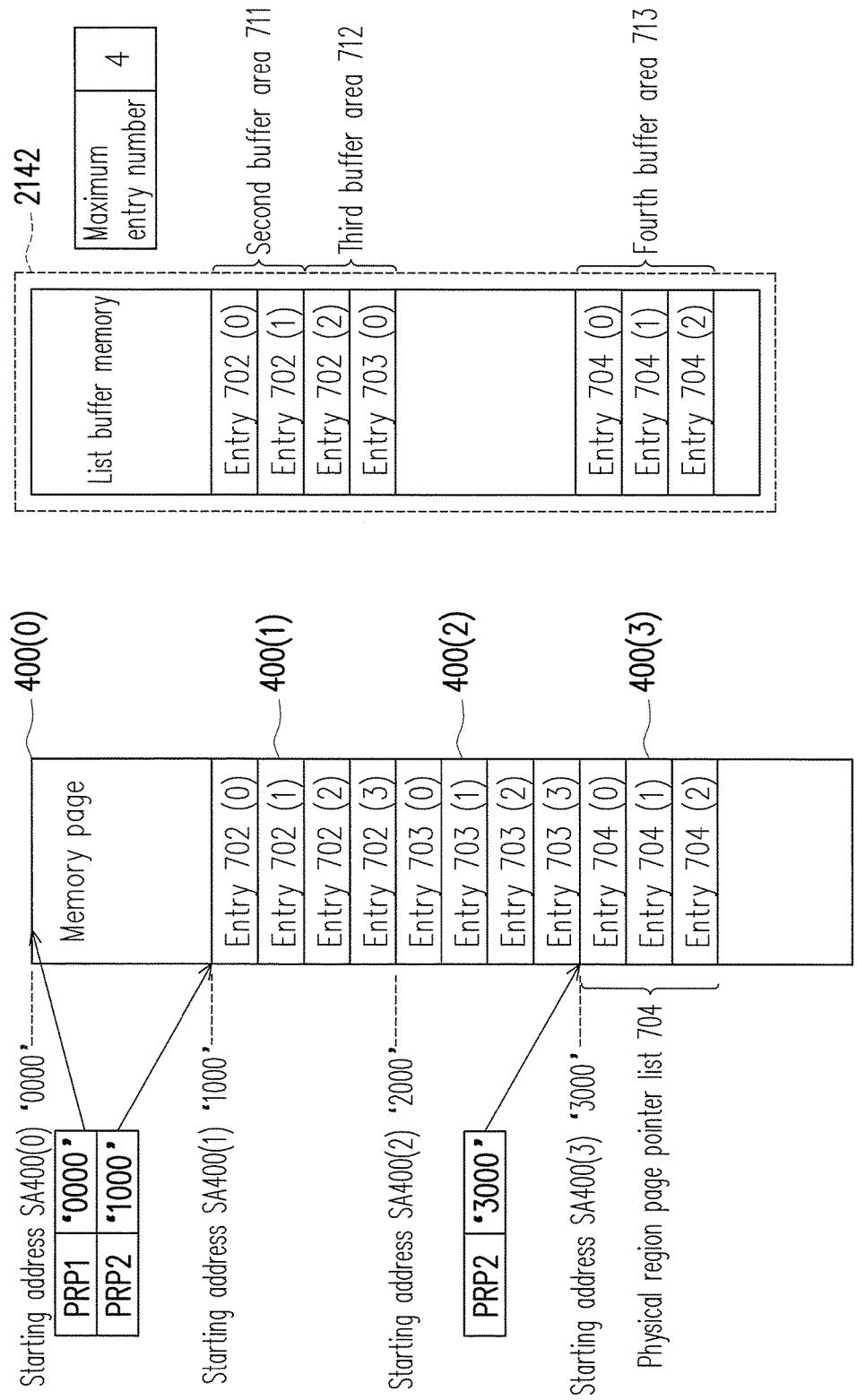
FIG. 9 is a schematic diagram illustrating buffering the physical region page pointer list according to another embodiment of the invention.

FIG. 9 is a schematic diagram illustrating buffering the physical region page pointer list according to another embodiment of the invention. The hardware components in FIG. 9 are the same as FIG. 8, which are not repeated herein. Only the differences between FIG. 9 and FIG. 8 are illustrated in the following descriptions. Referring to FIG. 9, it is assumed that in the example of FIG. 9, the storage controller 210 further receive another transmission command from the host system 10, and the value of the second physical region page pointer of the another transmission command is "3000", which indicates the starting address of another physical region page pointer list 704. The physical region page pointer list 704 has 3 entries 704(0) to 704(2). Since the number (e.g., 3) of the three entries 704(0) to 704(2) of the physical region page pointer list 704 is less than the maximum entry number, the list management circuit 214 may buffer the entries 704(0) to 704(2) into the fourth buffer area in which the buffer area entry number is correspondingly assigned to be "3". The detailed operation of buffering the entries of the physical region page pointer list is similar to which in the aforementioned embodiments, which is not repeated herein.

Referring to FIG. 3 again. In the present embodiment, if the data transfer management circuit 212 determines the second memory page address is not the first list starting address of the first physical region page pointer list of the at least one physical region page pointer list corresponding to the transmission command in the step S320, the data transfer management circuit 212 may directly transmit the target data according to the transmission command in step S350. Specifically, as described above, the data transfer management circuit 212 may directly identify the address of the target memory page and the corresponding logical block according to the transmission command, in order to transmit the target data.

In the present embodiment, after the data transfer management circuit 212 completes the corresponding data transmission operation according to the entries of the buffer area, the buffer area is flushed so as to store other entries of the physical region page pointer list. In the following, the related details are illustrated with FIG. 10 to FIG. 13.

Figure 10:
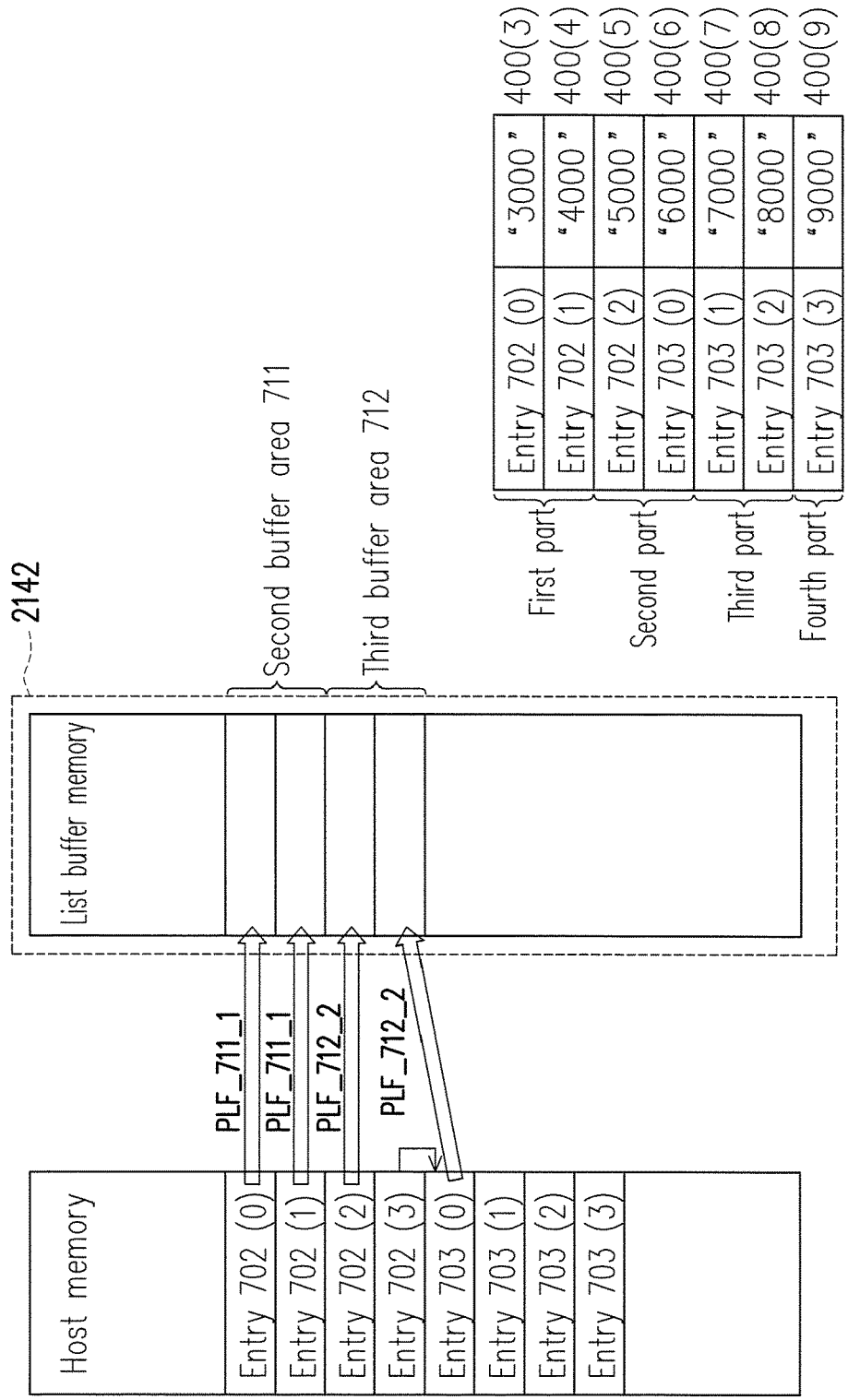
FIG. 10 is a schematic diagram illustrating buffering the physical region page pointer list according to an embodiment of the invention.
Figure 11:
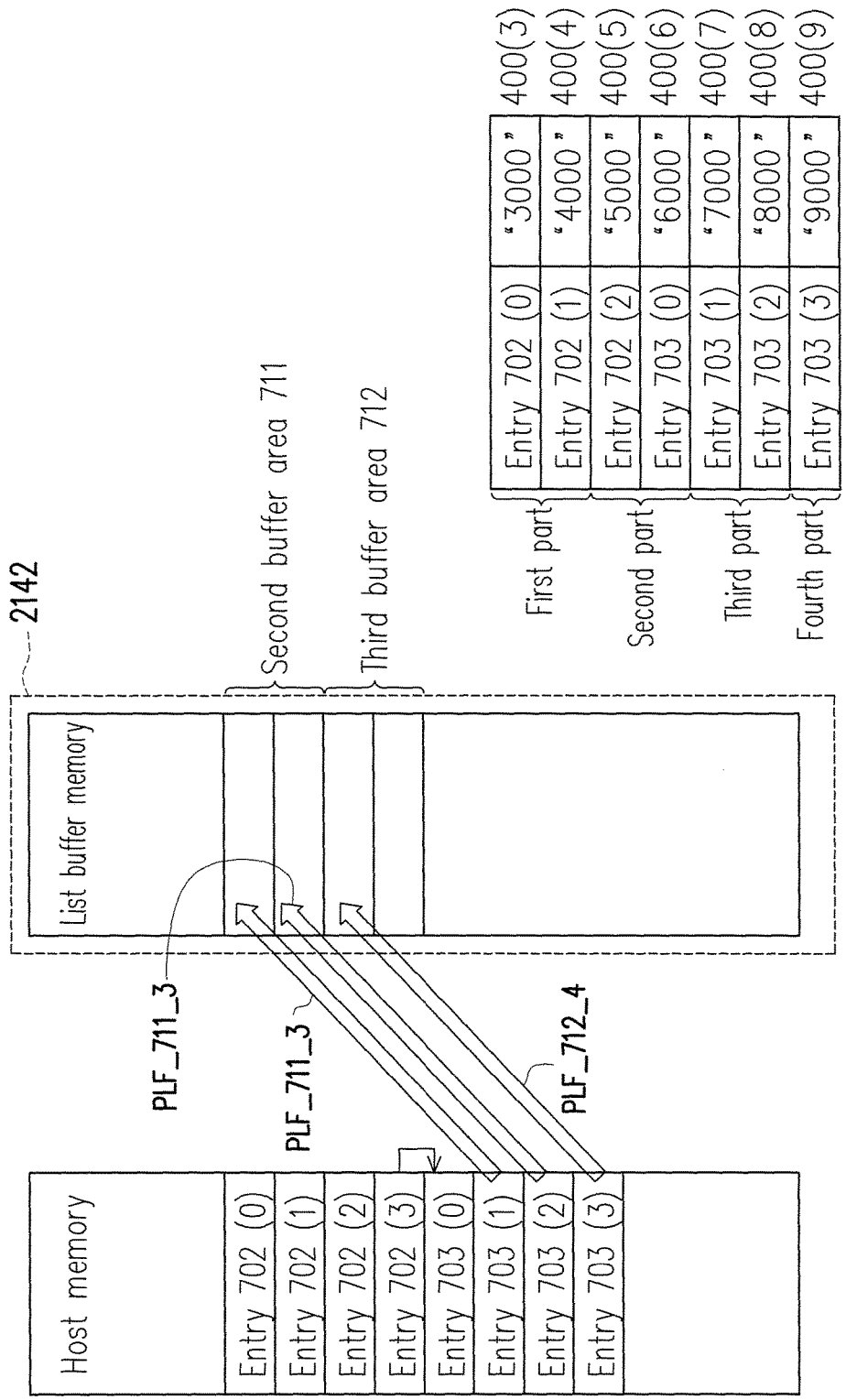
FIG. 11 is a schematic diagram illustrating buffering the physical region page pointer list according to an embodiment of the invention.
Figure 12:
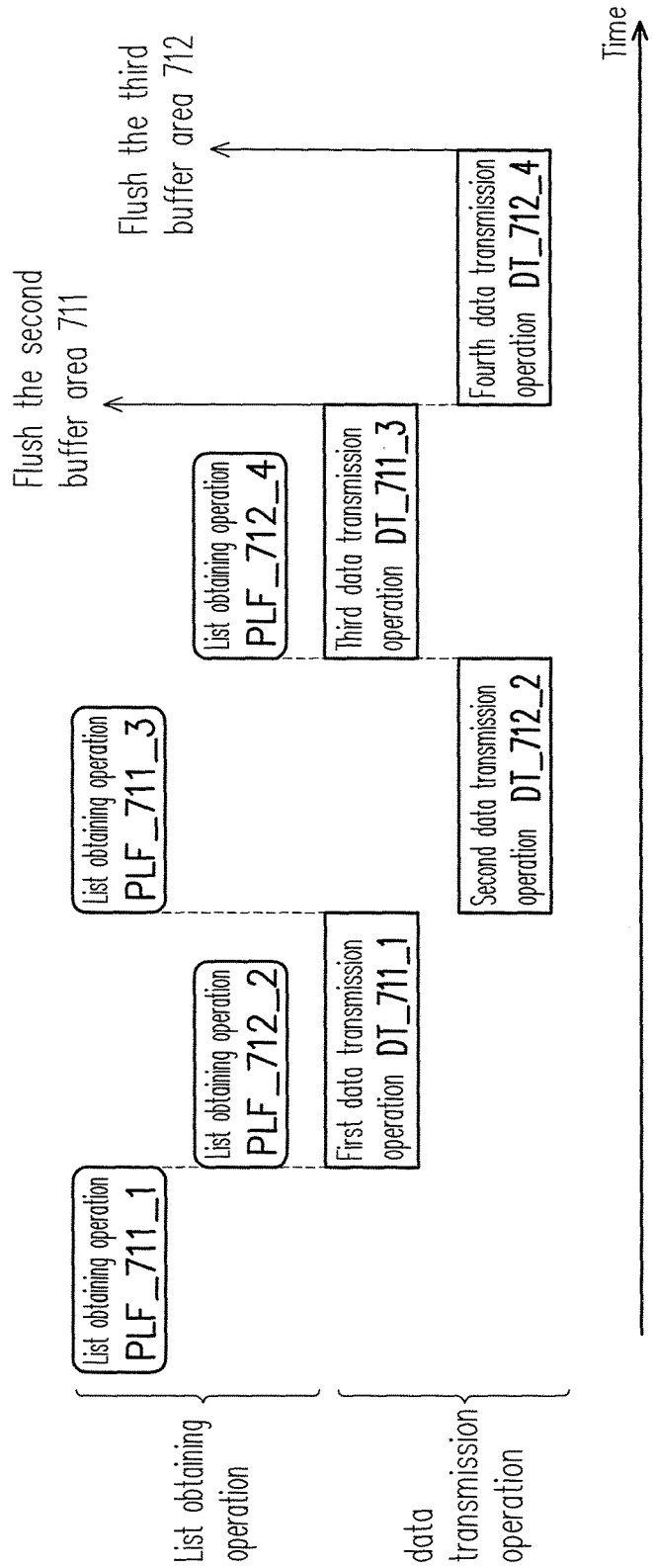
FIG. 12 is a schematic diagram illustrating a list obtaining operation and a data transmission operation corresponding to a read command according to an embodiment of the invention.

FIG. 10 is a schematic diagram illustrating buffering the physical region page pointer list according to an embodiment of the invention. FIG. 11 is a schematic diagram illustrating buffering the physical region page pointer list according to an embodiment of the invention. FIG. 12 is a schematic diagram illustrating a list obtaining operation and a data transmission operation corresponding to a read command according to an embodiment of the invention.

Referring to FIG. 10 and FIG. 12 together, it is assumed that the transmission command is a read command. The physical region page pointer list has eight entries 702(0) to 702(3), 703(0) to 703(3) corresponding to the read command, where the entry 702(3) of the physical region page pointer list 702 is configured to indicate the starting address of another physical region page pointer list 703. The entries 702(0) to 702(2) and the entries 703(0) to 703(3) used for recording the target memory pages in the physical region page pointer lists 702 and 703 are grouped into a first part to a fourth part. In which, the first part is the entries 702(0), 702(1); the second part is the entries 702(2), 703(0); the third part is the entries 703(1), 703(2); the fourth part is the entries 703(3). The memory page addresses and the target memory pages corresponding to the entries 702(0) to 702(2) and the entries 703(0) to 703(3) are shown as the right table of FIG. 10.

Referring to FIG. 12, the list obtaining operation is used to represent the overall operations of the step S330 in FIG. 3. That is, reading a part (or all) of the at least one physical region page pointer list from the host memory according to the transmission command, and buffering the read part (or all). The timeline of the list obtaining operation and the data transmission operation is shown in FIG. 12, where the time goes from the left to the right (as the time coordinate axis shown below).

At first, in the list obtaining operation PLF_711_1, the list controller 2141 assigns the second buffer area 711, instructs the list obtaining circuit 2143 to read the entries 702(0) and 702(1) of the first part from the host memory 120, and buffers the read entries 702(0) and 702(1) into the second buffer area 711 of the list buffer memory 2142 (e.g., the arrow PLF_711_1 shown in FIG. 10); in the list obtaining operation PLF_712_2, the list controller 2141 assigns the third buffer area 712, instructs the list obtaining circuit 2143 to read the entries 702(2) and 703(0) of the second part from the host memory 120, and buffers the read entries 702(2) and 703(0) into the third buffer area 712 of the list buffer memory 2142 (e.g., the arrow PLF_712_2 shown in FIG. 10).

Since the NVMe protocol supports the full-duplex bidirectional transfer mode, that is, the data read operation and the data write operation can be performed simultaneously. At the time of performing the list obtaining operation PLF_712_2, the data transfer management circuit 212 can perform the first data transmission (read) operation DT_711_1. More specifically, in the case of the transmission command being a read command, the list obtaining operation PLF_712_2 reads data from the host memory 120, and the first data transmission (read) operation DT_711_1 writes data into the host memory 120. Therefore, two operations can be performed simultaneously. In which, the first data transmission operation DT_711_1 is a data transmission operation performed between the target memory pages recorded in the entries 702(0), 702(1) and the target logical blocks corresponding to the entries 702(0), 702(1) by the data transfer management circuit 212 according to the entries 702(0), 702(1) in the second buffer area. Namely, in the case of the transmission command being a read command, the data transfer management circuit 212 read the data in the target logical blocks corresponding to the entries 702(0), 702(1) into the target memory pages recorded in the entries 702(0), 702(1) according to the entries 702(0), 702(1) in the second buffer area.

Referring to FIG. 11 and FIG. 12, after the first data transmission (read) operation DT_711_1 is completed, the list management circuit 214 performs the list obtaining operation PLF_711_3.

In detail, the list controller 2141 flushes the second buffer area 711 from the list buffer memory 2142. Next, the list controller 2141 selects an unbuffered part from the physical region page pointer list 702 as the third part (e.g., the entries of the third part shown in FIG. 10), and instructs list obtaining circuit 2143 to read the third part from the host memory 120. The list controller 2141 buffers the read third part into the second buffer area 711 (as the arrow PLF_711_3 shown in FIG. 11). Then, the data transfer management circuit 212 performs a third data transmission operation DT_711_3 according to the entries 703(1), 703(2) of the third part buffered in the second buffer area 711.

In addition, after the first data transmission (read) operation DT_711_1 is completed, the data transfer management circuit 212 performs a second data transmission (read) operation DT_712_2 according to the entries 702(2), 702(3) in the third buffer area. The details are similar to the aforementioned illustrations of the first data transmission operation, which is not repeated herein. It is noted that, as described above, in the case of the transmission command being a read command, the list obtaining operation PLF_711_3 and the second data transmission operation DT_712_2 can be performed simultaneously.

Next, referring to FIG. 11 and FIG. 12, after the second data transmission operation DT_712_2 is completed, similarly, the list management circuit 214 performs the list obtaining operation PLF_712_4.

In detail, the list controller 2141 flushes the third buffer area 712 from the list buffer memory 2142. Next, the list controller 2141 selects the fourth part from the physical region page pointer list 702 (e.g., the entry 703(3) of the fourth part shown in FIG. 10), and instructs list obtaining circuit 2143 to read the fourth part from the host memory 120. The list controller 2141 buffers the read fourth part into the third buffer area 712 (as the arrow PLF_712_4 shown in FIG. 11). Then, the data transfer management circuit 212 performs a fourth data transmission operation DT_712_4 according to the entry 703(3) of the fourth part buffered in the third buffer area 712.

In addition, similarly, after the second data transmission (read) operation DT_712_2 is completed, the data transfer management circuit 212 performs a third data transmission (read) operation DT_711_3 according to the entries 703(1), 703(2) in the second buffer area. The details are similar to the aforementioned illustrations of the first data transmission operation, which is not repeated herein. It is noted that, as described above, in the case of the transmission command being a read command, the list obtaining operation PLF_712_4 and the third data transmission operation DT_711_3 can be performed simultaneously.

After the third data transmission operation DT_711_3 is completed, the list management circuit 214 determines whether the parts of the physical region page pointer list corresponding to the transmission command is being buffered. If there are some parts unbuffered, the list management circuit 214 selects one unbuffered part to perform the buffer operation. In the example of FIG. 10 and FIG. 12, the list controller 2141 determines all parts of the physical region page pointer list are buffered, the list controller 2141 flushes the second buffer area 711.

Similarly, after the fourth data transmission operation DT_712_4 is completed, the list controller 2141 determines all parts of the physical region page pointer list are buffered, the list controller 2141 flushes the third buffer area 712.

In the example of FIG. 12, the data transmission method provided in the present embodiment utilizes the characteristic of full-duplex of the NVMe to buffer the physical region page pointer list, so the data transfer management circuit 212 is not required to read the physical region page pointer list from the host memory 120. Accordingly, the data transfer management circuit 212 can read the physical region page pointer list directly from the list buffer memory 2142, so that the delay between the data transfer interface circuit 130 and the connection interface circuit 230 is reduced.

Figure 13:
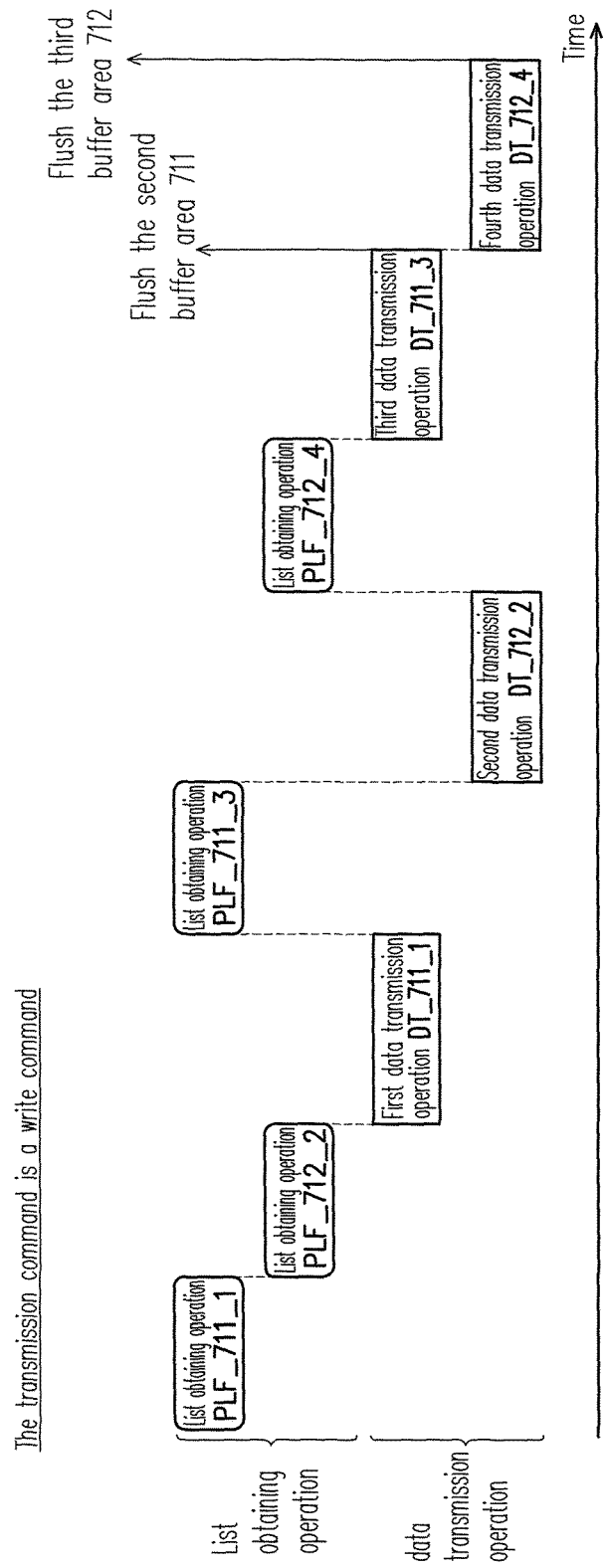
FIG. 13 is a schematic diagram illustrating a list obtaining operation and a data transmission operation corresponding to a write command according to an embodiment of the invention.

FIG. 13 is a schematic diagram illustrating a list obtaining operation and a data transmission operation corresponding to a write command according to an embodiment of the invention.

Referring to FIG. 13, the details of the list obtaining operation and the data transmission operation in FIG. 13 are similar to those in FIG. 12. However, the difference between FIG. 12 and FIG. 13 is that the transmission command of FIG. 13 is a write command. Accordingly, the list obtaining operation and the data transmission method cannot be performed simultaneously. Each list obtaining operation and data transmission operation has to wait for the previous operation.

Referring to FIG. 13, for example, after the list obtaining operations PLF_711_1, PLF_712_2 are completed by the list management circuit 214 and the entries of the first part and the second part are buffered into the second and the third buffer area, the data transfer management circuit 212 may perform the first data transmission operation DT_711_1 according to the buffered entries. The list management circuit 214 performs the list obtaining operation PLF_711_3 to buffer the entries of the third part into the second buffer area only when the first data transmission (write) operation DT_711_1 is completed. Then, the data transfer management circuit 212 performs the second data transmission (write) operation DT_712_2 according to the buffered entries of the second part only when the list obtaining command PLF_711_3 is completely performed by the list management circuit 214. The rest may be deduced by analogy until the entries of all the parts are buffered completely and the corresponding data are transmitted (written) completely. Finally, the second buffer area 711 and the third buffer area 712 are flushed.

In the example of FIG. 13, the list obtaining operation and the data transmission operation corresponding to the write command are not able to achieve the effect of substantially reducing the delay between the data transfer interface circuit 130 and the connection interface circuit 230 by utilizing the characteristic of full-duplex of the NVMe as FIG. 12 does. However, the delay between the data transfer interface circuit 130 and the connection interface circuit 230 is still reduced by reading the entries of the physical region page pointer list from the list buffer memory 2142.

In summary, in the data transmission method, and the storage controller and the list management circuit using the method provided by the embodiments of the present invention, a hardware is used to buffer the physical region page pointer list corresponding to the transmission command, so that the data transmission operation can be performed by the buffered physical region page pointer list. In this way, the delay between the storage apparatus and the host system is reduced, the speed of data transfer is increased, and the working efficiencies of the storage apparatus the data transmission operation performed by the storage apparatus are improved.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A data transmission method, suitable for a data transmission operation between a host memory of a host system and a rewritable non-volatile memory module, wherein the rewritable non-volatile memory module is assigned with a plurality of logical blocks and coupled to a storage controller, the host memory has a plurality of memory pages, and the data transmission method comprises:

receiving a transmission command from a host system, wherein the transmission command comprises a starting logical block address (SLBA), a number of logical blocks (NLB), a first physical region page pointer (PRP1), and a second physical region page pointer (PRP2), wherein the transmission command is configured to transmit target data between at least one target logical block of the rewritable non-volatile memory module and at least one target memory page of the host memory, wherein the starting logical block address is configured to indicate an address of the foremost target logical block in the at least one target logical block, the number of logical blocks is configured to indicate a number of the logical blocks storing the target data in the at least one target logical block, the first physical region page pointer is configured to indicate a first memory page address of the host memory, and the second physical region page pointer is configured to indicate a second memory page address of the host memory;

if the second memory page address is a first list starting address of a first physical region page pointer list of at least one physical region page pointer list corresponding to the transmission command, reading a part of the at least one physical region page pointer list from the host memory according to the transmission command, and buffering the read part of the at least one physical region page pointer list in a list buffer memory of the storage controller; and transmitting corresponding data according to the part of the at least one physical region page pointer list buffered in the list buffer memory of the storage controller, wherein the transmitted data is a part of the target data, wherein each of the at least one physical region page pointer list corresponding to the transmission command stores a plurality of entries, wherein each of the entries records different memory page address, wherein the entries are sequentially grouped into a plurality of parts, wherein the step of reading the part of the at least one physical region page pointer list from the host memory according to the transmission command, and buffering the read part of the at least one physical region page pointer list in the list buffer memory of the storage controller comprises:

calculating a number of the entries of the at least one physical region page pointer list according to the transmission command;

determining whether the number of the entries is greater than a maximum entry number;

if the number of the entries is not greater than the maximum entry number, assigning a first buffer area in the list buffer memory of the storage controller, reading all of the entries of the at least one physical region page pointer list from the host memory according to the transmission command, and buffering all of the read entries into the first buffer area; and if the number of the entries is greater than the maximum entry number, assigning a second buffer area and a third buffer area in the list buffer memory of the storage controller, reading a first part and a second part of the at least one physical region page pointer list from the host memory according to the transmission command, buffering the read first part into the second buffer area, and buffering the read second part into the third buffer area, wherein the step of transmitting corresponding data according to the part of the physical region page pointer list buffered in the list buffer memory of the storage controller comprises:
if the number of the entries is not greater than the maximum entry number, transmitting all the target data corresponding to the transmission command according to all of the entries buffered in the first buffer area; and
if the number of the entries is greater than the maximum entry number, performing a first data transmission operation according to the entries in the first part buffered in the second buffer area, and performing a second data transmission operation according to the entries in the second part buffered in the third buffer area, wherein each of the entries in the first part records a different first memory page address, and each of the entries in the second part records a different second memory page address,
wherein the first data transmission operation transmits corresponding data between the first memory page addresses of the host memory and a plurality of first target logical blocks corresponding to the first memory page addresses in the at least one target logical block, and the second data transmission operation transmits corresponding data between the second memory page addresses of the host memory and a plurality of second target logical blocks corresponding to the second memory page addresses in the at least one target logical block.

2. The data transmission method as claimed in claim 1, further comprising:
calculating a size of the target data according to a size of each of the logical blocks and the number of logical blocks;
determining an ending address of the memory page to which the first memory page address belongs according to a size of each of the memory pages and the first physical region page pointer, and using a space between the ending address and the first memory page address as an initial memory page space;
calculating a difference obtained from the size of the target data minus a size of the initial memory page space;
determining the second memory page address of the second physical region page pointer is the first list starting address of the first physical region page pointer list if the difference is greater than the size of each of the memory pages.

3. The data transmission method as claimed in claim 1, wherein the step of assigning the first buffer area if the number of the entries is not greater than the maximum entry number comprises: assigning a memory space in the list buffer memory as the first buffer area corresponding to the transmission command, wherein a size of the first buffer area is equal to a size of all the entries of the at least one physical region page pointer list,
wherein the step of assigning the second buffer area and the third buffer area if the number of the entries is greater than the maximum entry number comprises: assigning two respective memory spaces in the list buffer memory as the second buffer area and the third buffer area corresponding to the transmission command, wherein sizes of the second buffer area and the third buffer area are less than or equal to a predetermined size.

4. The data transmission method as claimed in claim 3, wherein the predetermined size is a total size of half the maximum entry number of the entries, wherein a number of the entries in the first part or the second part is less than or equal to half the maximum entry number.

5. The data transmission method as claimed in claim 1, further comprising:
after completing the first data transmission operation, flushing the second buffer area, selecting an unbuffered part from the parts of the at least one physical region page pointer list as a third part, and reading the third part from the host memory, buffering the read third part into the second buffer area, and performing a third data transmission operation according to the entries in the third part buffered in the second buffer area; and
after completing the second data transmission operation, flushing the third buffer area, selecting an unbuffered part from the parts of the at least one physical region page pointer list as a fourth part, and reading the fourth part from the host memory, buffering the read fourth part into the third buffer area, and performing a fourth data transmission operation according to the entries in the fourth part buffered in the third buffer area.

6. A storage controller, configured to control a storage device having a rewritable non-volatile memory module, the storage controller comprising:
a connection interface circuit, configured to couple to a host system, wherein the host system has a host memory, wherein the host memory has a plurality of memory pages;
a memory interface control circuit, configured to couple to the rewritable non-volatile memory module, wherein the rewritable non-volatile memory module is assigned with a plurality of logical blocks;
a processor, coupled to the connection interface circuit and the memory interface control circuit;
a data transfer management circuit, coupled to the processor, the connection interface circuit and the memory interface control circuit;
a list management circuit, comprising a list buffer memory and coupled to the data transfer management circuit, the processor, the connection interface circuit and the memory interface control circuit, wherein
the processor is configured to receive a transmission command from a host system, wherein the transmission command comprises a starting logical block address (SLBA), a number of logical blocks (NLB), a first physical region page pointer (PRP1), and a second physical region page pointer (PRP2), wherein the transmission command is configured to transmit target data between at least one target logical block of the rewritable non-volatile memory module and at least one target memory page of the host memory, wherein the starting logical block address is configured to indicate an address of the foremost target logical block in the at least one target logical block, the number of logical blocks is configured to indicate a number of the logical blocks storing the target data in the at least one target logical block, the first physical region page pointer is configured to indicate a first memory page address of the host memory, and the second physical region page pointer is configured to indicate a second memory page address of the host memory,
wherein if the second memory page address is a first list starting address of a first physical region page pointer list of at least one physical region page pointer list corresponding to the transmission command, the list management circuit is configured to read a part of the at least one physical region page pointer list from the host memory according to the transmission command, and buffer the read part of the at least one physical region page pointer list in the list buffer memory, wherein the data transfer management circuit is configured to transmit corresponding data according to the part of the at least one physical region page pointer list buffered in the list buffer memory, wherein the transmitted data is a part of the target data, wherein each of the at least one physical region page pointer list corresponding to the transmission command stores a plurality of entries, wherein each of the entries records different memory page address, wherein the entries are sequentially grouped into a plurality of parts, wherein in the operation of reading the part of the at least one physical region page pointer list from the host memory according to the transmission command, and buffering the read part of the at least one physical region page pointer list in the list buffer memory by the list management circuit, the list management circuit calculates a number of the entries of the at least one physical region page pointer list according to the transmission command, wherein the list management circuit determines whether the number of the entries is greater than a maximum entry number, wherein if the number of the entries is not greater than the maximum entry number, the list management circuit assigns a first buffer area in the list buffer memory, and reads all of the entries of the at least one physical region page pointer list from the host memory according to the transmission command, wherein the list management circuit buffers all of the read entries into the first buffer area, wherein if the number of the entries is greater than the maximum entry number, the list management circuit assigns a second buffer area and a third buffer area in the list buffer memory, and reads a first part and a second part of the at least one physical region page pointer list from the host memory according to the transmission command, wherein the list management circuit buffers the read first part into the second buffer area, and buffering the read second part into the third buffer area, wherein in the operation of transmitting corresponding data according to the part of the physical region page pointer list buffered in the list buffer memory by the data transfer management circuit, if the number of the entries is not greater than the maximum entry number, the data transfer management circuit transmits all the target data corresponding to the transmission command according to all of the entries buffered in the first buffer area, wherein if the number of the entries is greater than the maximum entry number, the data transfer management circuit performs a first data transmission operation according to the entries in the first part buffered in the second buffer area, and performs a second data transmission operation according to the entries in the second part buffered in the third buffer area, wherein each of the entries in the first part records a different first memory page address, and each of the entries in the second part records a different second memory page address, wherein the first data transmission operation transmits corresponding data between the first memory page addresses of the host memory and a plurality of first target logical blocks corresponding to the first memory page addresses in the at least one target logical block, and the second data transmission operation transmits corresponding data between the second memory page addresses of the host memory and a plurality of second target logical blocks corresponding to the second memory page addresses in the at least one target logical block.

7. The storage controller as claimed in claim 6, wherein the data transfer management circuit calculates a size of the target data according to a size of each of the logical blocks and the number of logical blocks, wherein the data transfer management circuit determines an ending address of the memory page to which the first memory page address belongs according to a size of each of the memory pages and the first physical region page pointer, and use a space between the ending address and the first memory page address as an initial memory page space, wherein the data transfer management circuit calculates a difference obtained from the size of the target data minus a size of the initial memory page space, wherein the data transfer management circuit determines the second memory page address of the second physical region page pointer is the first list starting address of the first physical region page pointer list if the difference is greater than the size of each of the memory pages.

8. The storage controller as claimed in claim 6, wherein in the operation of assigning the first buffer area by the list management circuit if the number of the entries is not greater than the maximum entry number, the list management circuit assigns a memory space in the list buffer memory as the first buffer area corresponding to the transmission command, wherein a size of the first buffer area is equal to a size of all the entries of the at least one physical region page pointer list, wherein in the operation of assigning the second buffer area and the third buffer area by the list management circuit if the number of the entries is greater than the maximum entry number, the list management circuit assigns two respective memory spaces in the list buffer memory as the second buffer area and the third buffer area corresponding to the transmission command, wherein the sizes of the second buffer area and the third buffer area are less than or equal to a predetermined size.

9. The storage controller as claimed in claim 8, wherein the predetermined size is a total size of half the maximum entry number of the entries, wherein a number of the entries in the first part or the second part is less than or equal to half the maximum entry number.

10. The storage controller as claimed in claim 6, wherein after completing the first data transmission operation, the list management circuit flushes the second buffer area, selects an unbuffered part from the parts of the at least one physical region page pointer list as a third part, and reads the third part from the host memory, wherein the list management circuit buffers the read third part into the second buffer area, and the data transfer management circuit performs a third data transmission operation according to the entries in the third part buffered in the second buffer area, wherein after completing the second data transmission operation, the list management circuit flushes the third buffer area, selects an unbuffered part from the parts of the at least one physical region page pointer list as a fourth part, and reads the fourth part from the host memory, wherein the list management circuit buffers the read fourth part into the third buffer area, and the data transfer management circuit performs a fourth data transmission operation according to the entries in the fourth part buffered in the third buffer area.

11. A list management circuit, disposed in a storage controller of a storage device, wherein the storage controller comprises: a connection interface circuit, a memory interface control circuit and a processor,
wherein the connection interface circuit is configured to couple to a host system, wherein the host system has a host memory, wherein the host memory has a plurality of memory pages, wherein the memory interface control circuit is configured to couple to the rewritable non-volatile memory module, wherein the rewritable non-volatile memory module is assigned with a plurality of logical blocks, wherein the processor is coupled to the connection interface circuit and the memory interface control circuit, wherein the data transfer management circuit is coupled to the processor, the connection interface circuit and the memory interface control circuit,
wherein the list management circuit is coupled the data transfer management circuit, the processor, the connection interface circuit and the memory interface control circuit, the list management circuit comprises:
a list controller;
a list buffer memory, coupled to the list controller; and
a list obtaining circuit, coupled to the list controller and the list buffer memory,
wherein the processor is configured to receive a transmission command from a host system, wherein the transmission command comprises a starting logical block address (SLBA), a number of logical blocks (NLB), a first physical region page pointer (PRP1), and a second physical region page pointer (PRP2), wherein the transmission command is configured to transmit target data between at least one target logical block of the rewritable non-volatile memory module and at least one target memory page of the host memory, wherein the starting logical block address is configured to indicate an address of the foremost target logical block in the at least one target logical block, the number of logical blocks is configured to indicate a number of the logical blocks storing the target data in the at least one target logical block, the first physical region page pointer is configured to indicate a first memory page address of the host memory, and the second physical region page pointer is configured to indicate a second memory page address of the host memory,
wherein if the second memory page address is a first list starting address of a first physical region page pointer list of at least one physical region page pointer list (PRP list) corresponding to the transmission command, the list controller is configured to instruct the list obtaining circuit to read a part of the at least one physical region page pointer list from the host memory according to the transmission command, and the list controller is further configured to buffer the read part of the at least one physical region page pointer list into the list buffer memory,
wherein the data transfer management circuit is configured to transmit corresponding data according to the buffered part of the at least one physical region page pointer list, wherein the transmitted data is a part of the target data,
wherein each of the at least one physical region page pointer list corresponding to the transmission command stores a plurality of entries, wherein each of the entries records different memory page address, wherein the entries are sequentially grouped into a plurality of parts,
wherein in the operation of instructing the list obtaining circuit to read the part of the at least one physical region page pointer list from the host memory according to the transmission command, and buffering the read part of the at least one physical region page pointer list into the list buffer memory by the list controller,
the list controller calculates a number of the entries of the at least one physical region page pointer list according to the transmission command,
wherein the list controller determines whether the number of the entries is greater than a maximum entry number,
wherein if the number of the entries is not greater than the maximum entry number, the list controller assigns a first buffer area in the list buffer memory, and instructs the list obtaining circuit to read all of the entries of the at least one physical region page pointer list from the host memory, wherein the list controller buffers all of the read entries of the at least one physical region page pointer list into the first buffer area,
wherein if the number of the entries is greater than the maximum entry number, the list controller assigns a second buffer area and a third buffer area in the list buffer memory, and instructs the list obtaining circuit to read a first part and a second part of the at least one physical region page pointer list from the host memory, wherein the list controller buffers the read first part into the second buffer area, and buffers the read second part into the third buffer area,
wherein in the operation of transmitting corresponding data according to the buffered part of the physical region page pointer list by the data transfer management circuit,
if the number of the entries is not greater than the maximum entry number, the data transfer management circuit transmits all the target data corresponding to the transmission command according to all of the entries buffered in the first buffer area,
wherein if the number of the entries is greater than the maximum entry number, the data transfer management circuit performs a first data transmission operation according to the entries in the first part buffered in the second buffer area, and performs a second data transmission operation according to the entries in the second part buffered in the third buffer area, wherein each of the entries in the first part records a different first memory page address, and each of the entries in the second part records a different second memory page address, wherein
the first data transmission operation transmits corresponding data between the first memory page addresses of the host memory and a plurality of first target logical blocks corresponding to the first memory page addresses in the at least one target logical block, and the second data transmission operation transmits corresponding data between the second memory page addresses of the host memory and a plurality of second target logical blocks corresponding to the second memory page addresses in the at least one target logical block.

12. The list management circuit as claimed in claim 11, wherein
the data transfer management circuit calculates a size of the target data according to a size of each of the logical blocks and the number of logical blocks,
wherein the data transfer management circuit determines an ending address of the memory page to which the first memory page address belongs according to the size of each of the memory pages and the first physical region page pointer, and use a space between the ending address and the first memory page address as an initial memory page space,
wherein the data transfer management circuit calculates a difference obtained from the size of the target data minus the size of the initial memory page space,
wherein the data transfer management circuit determines the second memory page address of the second physical region page pointer is the first list starting address of the first physical region page pointer if the difference is greater than the size of each of the memory pages.

13. The list management circuit as claimed in claim 11, wherein
in the operation of assigning the first buffer area by the list management circuit if the number of the entries is not larger than the maximum entry number, the list management circuit assigns a memory space in the list buffer memory as the first buffer area corresponding to the transmission command, wherein a size of the first buffer area is equal to a size of all the entries of the at least one physical region page pointer list, wherein
in the operation of assigning the second buffer area and the third buffer area in the list buffer memory by the list controller if the number of the entries is greater than the maximum entry number, the list controller assigns two respective memory spaces in the list buffer memory as the second buffer area and the third buffer area corresponding to the transmission command, wherein the sizes of the second buffer area and the third buffer area are less than or equal to a predetermined size.

14. The list management circuit as claimed in claim 13, wherein the predetermined size is a total size of half the maximum entry number of the entries, wherein a number of the entries in the first part or the second part is less than or equal to half the maximum entry number.

15. The list management circuit as claimed in claim 11, wherein
after completing the first data transmission operation, the list controller flushes the second buffer area from the list buffer memory, the list controller selects an unbuffered part from the parts of the at least one physical region page pointer list as a third part, and instructs the list obtaining circuit to read the third part from the host memory, wherein the list controller buffers the read third part into the second buffer area, and the data transfer management circuit performs a third data transmission operation according to the entries in the third part buffered in the second buffer area,
wherein after completing the second data transmission operation, the list controller flushes the third buffer area from the list buffer memory, the list controller selects an unbuffered part from the parts of the at least one physical region page pointer list as a fourth part, and instructs the list obtaining circuit to read the fourth part from the host memory, wherein the list controller buffers the read fourth part into the third buffer area, and the data transfer management circuit performs a fourth data transmission operation according to the entries in the fourth part buffered in the third buffer area.

* * * * *